United States Patent
Cothran et al.

(10) Patent No.: US 9,617,452 B2
(45) Date of Patent: *Apr. 11, 2017

(54) LIGNIN ADHESIVE

(71) Applicant: Georgia-Pacific Chemicals LLC, Atlanta, GA (US)

(72) Inventors: John D. Cothran, Conyers, GA (US); Paul S. Baxter, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/607,099

(22) Filed: Jan. 28, 2015

(65) Prior Publication Data

US 2015/0210904 A1 Jul. 30, 2015

Related U.S. Application Data

(60) Provisional application No. 61/932,338, filed on Jan. 28, 2014.

(51) Int. Cl.
| | | |
|---|---|---|
| *C09J 161/06* | (2006.01) | |
| *B27N 3/00* | (2006.01) | |
| *B27N 3/02* | (2006.01) | |
| *B32B 27/06* | (2006.01) | |
| *B32B 27/42* | (2006.01) | |
| *B32B 7/12* | (2006.01) | |
| *B32B 21/00* | (2006.01) | |
| *B32B 21/13* | (2006.01) | |
| *B32B 21/14* | (2006.01) | |
| *C09J 197/00* | (2006.01) | |
| *C08G 8/10* | (2006.01) | |

(52) U.S. Cl.
CPC ............ *C09J 161/06* (2013.01); *B27N 3/002* (2013.01); *B27N 3/02* (2013.01); *B32B 7/12* (2013.01); *B32B 21/00* (2013.01); *B32B 21/13* (2013.01); *B32B 21/14* (2013.01); *B32B 27/06* (2013.01); *B32B 27/42* (2013.01); *C09J 197/005* (2013.01); *B27N 3/00* (2013.01); *C08G 8/10* (2013.01); *Y10T 428/31949* (2015.04)

(58) Field of Classification Search
CPC .......... C09J 161/06; B27N 3/002; B27N 3/02; B32B 27/06; B32B 27/42
See application file for complete search history.

(56) References Cited

U.S. PATENT DOCUMENTS

| | | | |
|---|---|---|---|
| 2,492,510 A | 12/1949 | Epps | |
| 2,507,465 A | 5/1950 | Ayers | |
| 2,781,286 A | 2/1957 | Ayers et al. | |
| 3,268,460 A * | 8/1966 | Miller | .................... C09J 161/06 524/596 |
| 3,285,805 A | 11/1966 | Bryner | |
| 3,957,703 A | 5/1976 | Ludwig et al. | |
| 4,070,314 A | 1/1978 | Alexander et al. | |
| 4,244,846 A | 1/1981 | Edler | |
| 4,433,120 A * | 2/1984 | Chiu | ....................... C08L 61/06 156/335 |
| 4,778,530 A | 10/1988 | Ayers | |
| 5,173,527 A * | 12/1992 | Calve | ...................... C09J 161/06 524/72 |
| 6,497,760 B2 | 12/2002 | Sun et al. | |
| 2005/0250900 A1* | 11/2005 | Stofko | ....................... B05B 3/02 524/594 |

FOREIGN PATENT DOCUMENTS

| | | | | |
|---|---|---|---|---|
| CA | 1136793 | * | 12/1982 | .............. C08L 97/00 |
| WO | WO 2011/097719 | * | 8/2011 | .............. C09J 197/00 |

OTHER PUBLICATIONS

Dolenko et al. Resin Binders From Kraft Lignin. Forest Products Journal vol. 28, No. 8. Aug. 1978.*
Walter J. Wolf, "Kirk-Othmer, Encyclopedia of Chemical Technology", Fourth Edition, vol. 22, pp. 591-619, 1997.

* cited by examiner

*Primary Examiner* — John Uselding
(74) *Attorney, Agent, or Firm* — Ram W. Sabnis

(57) ABSTRACT

Powdered adhesives for making lignocellulosic composite products and methods for making same. The powdered adhesive can include a powdered phenol-aldehyde resin and a powdered kraft lignin. The powdered kraft lignin can contain less than 3 wt % of ash, as measured according to ASTM D2584-11. The powdered adhesive can contain less than 10 wt % of water.

18 Claims, No Drawings ially or fully cured. The fully cured powdered adhesive can be used to make composite products.

LIGNIN ADHESIVE

CROSS-REFERENCE TO RELATED APPLICATION

This application claims priority to U.S. Provisional Patent Application No. 61/932,338, filed Jan. 28, 2014, which is incorporated by reference herein.

FIELD

Embodiments described generally relate to adhesives for making wood composites. More particularly, the embodiments described relate to powdered adhesives that include one or more powdered lignin materials and one or more powdered phenol-formaldehyde resins, where the powdered adhesive contains less than 10 wt % of water.

BACKGROUND

Powdered or other particulate, curable phenol-aldehyde based resins, e.g., phenol-formaldehyde (PF) resins, have found wide use as an adhesive for a variety of lignocellulose composite products such as oriented strand board (OSB) and other similar wafer or chip board products. PF resins are typically prepared by reacting a molar excess of formaldehyde with phenol under liquid, e.g., aqueous, alkaline reaction conditions. The resulting liquid PF resin is then spray-dried to produce the curable PF resin powder that is used as an adhesive. One drawback to the use of PF resins as an adhesive is that PF resins are petroleum derived compounds and thus subject to variations in price and limitations in production quantities. There is also an interest in reducing the amount of formaldehyde, both during the production of PF resins and in finished lignocellulose composite products.

One approach to reducing the amount of phenol and formaldehyde in PF resins has been to use lignin as a reactant in the preparation of aldehyde-based resins. Lignin is a wood-derived polyphenol polymer that is most commonly produced as a by-product from the kraft wood pulping process. Typically, "black liquor" obtained from the kraft process is separated from the remaining wood pulp and then lignin is isolated from the black liquor by any number of methods. These new chemical species are commonly prepared by reacting lignin with the PF resin and/or an aldehyde/phenol starting material to form a new lignin modified aldehyde-based resin. Such lignin modified aldehyde based resins, however, are not only expensive, but also are complex and time consuming to make.

There is a need therefore, for improved phenol-aldehyde based adhesives for making lignocellulose composite products that can include a reduced amount of phenol and/or aldehyde.

SUMMARY

Powdered adhesives for making lignocellulosic composite products and methods for making same are provided. In at least one specific embodiment, the powdered adhesive can include a powdered phenol-aldehyde resin and a powdered kraft lignin. The powdered kraft lignin can contain less than 3 wt % of ash, as measured according to ASTM D2584-11. The powdered adhesive can contain less than 10 wt % of water.

In at least one specific embodiment, a method for making a composite product can include contacting a plurality of lignocellulose substrates with a powdered adhesive to produce a resinated furnish. The powdered adhesive can include a powdered phenol-aldehyde resin and a powdered kraft lignin. The powdered kraft lignin can contain less than 3 wt % of ash, as measured according to ASTM D2584-11. The powdered adhesive can contain less than 10 wt % of water. The powdered adhesive can be at least partially cured to produce a composite product.

In at least one specific embodiment, a composite product can include a plurality of lignocellulose substrates and an at least partially cured powdered adhesive. Prior to curing the powdered adhesive can include a powdered phenol-aldehyde resin and a powdered kraft lignin. The powdered kraft lignin can contain less than 3 wt % of ash, as measured according to ASTM D2584-11. The powdered adhesive can contain less than 10 wt % of water.

DETAILED DESCRIPTION

It has been surprisingly and unexpectedly discovered that mixing, blending, or otherwise combining one or more particulate or powdered lignin materials, e.g., powdered kraft lignin, and one or more particulate or powdered phenol-aldehyde resins, e.g., powdered phenol-formaldehyde resin, can produce or form a powdered adhesive mixture or simply "adhesive" that contains less than 10 wt % of water that can be used and handled the same or substantially the same as the particulate or powdered phenol-aldehyde, e.g., powdered phenol-formaldehyde resin, alone. It has also been surprisingly and unexpectedly discovered that mixing, blending, or otherwise combining the lignin material and the phenol-aldehyde resin produces or forms an adhesive that is significantly less explosive or has a significantly reduced explosivity when the adhesive contains less than 10 wt % of water as compared to the lignin material alone when the lignin material contain less than 10 wt % of water. The adhesive that includes the phenol-aldehyde resin and the lignin material and has a water content of less than 10 wt % can be safer to handle as compared to the neat, lignin material alone that has a water content of less than 10 wt %. The reduced explosivity can also reduce the capital investment required to handle the lignin blend as compared to the neat, powdered lignin material alone.

The adhesive that includes the lignin material and the phenol-aldehyde resin and contains less than 10 wt % of water can have an explosive constant ($K_{st}$) of less than 299 bar m/s and a minimum ignition energy (MIE) of greater than 100 mJ. The explosive constant ($K_{st}$), in units of pressure-distance over time, is a measure of the dust explosion severity for a given dust. The explosive constant ($K_{st}$) for a given dust can be calculated as the maximum rate of pressure rise multiplied by the cube root of the volume in which the dust was combusted in. The minimum ignition energy (MIE) is the lowest quantity of electrical energy stored in a capacitor that when discharged is just sufficient to ignite a given dust concentration in air. The minimum ignition energy (MIE) can be carried out at atmospheric temperature and pressure. The explosive constant ($K_{st}$) and the minimum ignition energy (MIE) of a given particulate or powdered material, e.g., a powdered lignin material or a powdered adhesive that includes a powdered lignin material and a powdered phenol-aldehyde resin, can be measured according to the ASTM E-1226-12A and ASTM E-2019-03 (2013) standardized tests, respectively, in a 20 L sphere. Additional properties of a given particulate or powdered adhesive can be measured according to the ASTM E-1491-

06(2012), ASTM E-2021-09(2013), and ASTM E-1515-07 standardized tests in a 20 L sphere.

The adhesive can have a water or moisture content of less than 20 wt %, less than 15 wt %, less than 10 wt %, less than 7 wt %, less than 6 wt %, less than 5 wt %, less than 4 wt %, less than 3 wt %, less than 2 wt %, less than 1 wt %, or less than 0.5 wt %, based on the total weight of the adhesive. For example, the adhesive can have a water or moisture content of about 0.5 wt % to about 3 wt %, about 1 wt % to about 2 wt %, about 0.5 wt % to about 1.5 wt %, about 1.5 wt % to about 3.5 wt %, about 1 wt % to about 2.5 wt %, about 0.7 wt % to about 3.5 wt %, about 3 wt % to about 6 wt %, about 4 wt % to about 8 wt %, about 5 wt % to about 7 wt %, about 6 wt % to about 9 wt %, or about 1 wt % to about 9.5 wt %, based on the total weight of the adhesive. As used herein, the term "moisture content" of a material is synonymous with the water content of a material. For example, a lignin material, e.g., kraft lignin, having a moisture content of less than 10 wt % of the lignin material is equivalent to a lignin material with a water content of less than 10 wt % of the lignin material. The water or moisture content of a sample, e.g., the lignin material, the phenol-aldehyde resin, or the mixture that includes the lignin material and the phenol-aldehyde resin, can be measured by determining the weight loss upon heating a small sample, e.g., 5-8 grams of the sample, to a suitable temperature, e.g., 105° C., and a time sufficient to remove the water therefrom. By measuring the weight of the sample before and after heating, the percent of moisture in the sample can be directly calculated or otherwise estimated.

The amount of the lignin material in the adhesive can be from a low of about 1 wt %, about 5 wt %, about 10 wt %, about 15 wt %, about 20 wt %, about 25 wt %, or about 30 wt % to a high of about 35 wt %, about 40 wt %, about 45 wt %, about 50 wt %, about 55 wt %, about 60 wt %, about 65 wt %, or about 70 wt %, based on the combined weight of the lignin material and the phenol-aldehyde resin. For example, the adhesive can include about 1 wt % to about 15 wt %, about 10 wt % to about 20 wt %, about 40 wt % to about 70 wt %, about 5 wt % to about 60 wt %, about 10 wt % to about 50 wt %, about 25 wt % to about 50 wt %, about 30 wt % to about 50 wt %, or about 40 wt % to about 50 wt %, based on the combined weight of the lignin material and the phenol-aldehyde resin. In another example, the amount of the lignin material in the adhesive can be at least 10 wt %, at least 20 wt %, at least 25 wt %, at least 30 wt %, or at least 35 wt % and up to about 40 wt %, about 45 wt %, about 50 wt %, about 55 wt %, or about 60 wt %, based on the combined weight of the lignin material and the phenol-aldehyde resin.

The amount of the lignin material in the adhesive can be from a low of about 1 vol %, about 5 vol %, about 10 vol %, about 15 vol %, about 20 vol %, about 25 vol %, or about 30 vol % to a high of about 35 vol %, about 40 vol %, about 45 vol %, about 50 vol %, about 55 vol %, or about 60 vol %, based on the combined volume of the lignin material and the phenol-aldehyde resin. For example, the adhesive can include about 1 vol % to about 15 vol %, about 10 vol % to about 20 vol %, about 40 vol % to about 70 vol %, about 5 vol % to about 60 vol %, about 10 vol % to about 50 vol %, about 25 vol % to about 50 vol %, about 30 vol % to about 50 vol %, or about 40 vol % to about 50 vol %, based on the combined volume of the lignin material and the phenol-aldehyde resin. In another example, the amount of the lignin material in the adhesive can be at least 10 vol %, at least 20 vol %, at least 25 vol %, at least 30 vol %, or at least 35 vol % and up to about 40 vol %, about 45 vol %, about 50 vol %, about 55 vol %, or about 60 vol %, based on the combined weight of the lignin material and the phenol-aldehyde resin.

The weight ratio, volume ratio, and/or molar ratio of the lignin material to the phenol-aldehyde resin in the adhesive can be from a low of about 1:99, about 1:19, about 1:7.5, about 1:1.5, or about 1:1 to a high of about 1:0.7, about 1:0.5, about 1:0.3, about 1:0.1, about 1:0.07, about 1:0.05, about 1:0.03, or about 1:0.01. For example, the weight ratio, volume ratio, and/or molar ratio of the lignin material to the phenol-aldehyde resin in the adhesive can be about 1:99 to about 99:1, about 5:95 to about 95:5, about 10:75 to about 75:10, about 2:3 to about 3:2, about 1:3 to about 3:1, about 1:2 to about 2:1, or about 1:1. 1:99 to about 99:1, about 5:95 to about 95:5, about 10:75 to about 75:10, about 2:3 to about 3:2, about 1:3 to about 3:1, about 1:2 to about 2:1, about 1:1 to about 1:1.5, or about 1.5:1 to about 1:1.

The adhesive that includes the lignin material and the phenol-aldehyde resin and contains less than 10 wt % of water can be mixed with water, where the lignin material and the phenol-aldehyde resin can be dispersed or suspended in the water to produce an aqueous dispersion or suspension. An aqueous dispersion or suspension that includes about 25 wt % of the mixture, where the mixture includes about 50 wt % to about 95 wt % of the phenol-aldehyde resin and about 5 wt % to about 50 wt % of the lignin material, based on the combined weight of the phenol-aldehyde resin and the lignin material, can have a pH from a low of about 7, about 8, about 9, or about 10 to a high of about 11, about 12, about 13, or about 14. For example, the pH of the dispersion or suspension that includes about 25 wt % of the mixture, where the mixture includes about 85 wt % of the phenol-aldehyde resin and about 15 wt % of the lignin material, based on the combined weight of the phenol-aldehyde resin and the lignin material, can be from about 7 to about 14, about 8 to about 13, or about 9 to about 12.5. In another example, the pH of the dispersion or suspension that includes about 25 wt % of the mixture, where the mixture includes about 70 wt % of the phenol-aldehyde resin and about 30 wt % of the lignin material, based on the combined weight of the phenol-aldehyde resin and the lignin material, can be at least 8, at least 8.5, at least 9, at least 9.5, or at least 10 and less than 13, less than 12.5, less than 12, less than 11.5, less than 11, or less than 10.5. The pH of the dispersion or suspension can be measured at a temperature of about 25° C. with an Orion 2Star pH meter from ThermoScientific. The pH meter can be equipped with a combination electrode that has been calibrated with standard solutions at a pH of 7.0 and a pH of 10.0 pH. About 50 grams of powder can be placed in a 500 ml beaker. About 150 grams of deionized water can be added to the powder. The slurry can be mechanically agitated until a uniform dispersion of the powder in water has been made. The dispersion can be allowed to stand at ambient conditions for about 5 minutes without agitation. The pH reading can then made by immersing the electrode in the dispersion.

The adhesive that includes the lignin material and the phenol-aldehyde resin and contains less than 10 wt % of water can have an explosion constant ($K_{st}$) from a low of about 0 bar m/s, about 25 bar m/s, about 50 bar m/s, about 75 bar m/s, about 100 bar m/s, or about 125 bar m/s to a high of about 150 bar m/s, about 175 bar m/s, about 200 bar m/s, about 225 bar m/s, about 250 bar m/s, about 275 bar m/s, or about 298 bar m/s. For example, the adhesive can have an explosion constant ($K_{st}$) of about 0 bar m/s to about 295 bar m/s, about 5 bar m/s to about 275 bar m/s, about 10 bar m/s to about 250 bar m/s, about 50 bar m/s to about 150 bar m/s, about 75 bar m/s to about 175 bar m/s, about 125 bar m/s to about 200 bar m/s, about 175 bar m/s to about 240 bar m/s, about 220 bar m/s to about 280 bar m/s, or about 125 bar m/s to about 190 bar m/s. In another example, the adhesive can have an explosion constant of less than 299 bar m/s, less than 200 bar m/s, less than 175 bar m/s, less than 150 bar m/s, less than 130 bar m/s, less than 100 bar m/s, or less than 50 bar m/s.

The adhesive that includes the lignin material and the phenol-aldehyde resin and contains less than 10 wt % of water can have a minimum ignition energy (MIE) from a low of about 100 mJ, about 150 mJ, about 200 mJ, about 250 mJ, about 300 mJ, or about 350 mJ to a high of about 400 mJ, about 500 mJ, about 650 mJ, about 800 mJ, about 1,000 mJ, about 1,100 mJ or more. For example, the adhesive can have a minimum ignition energy (MIE) of about 110 mJ to about 400 mJ, about 175 mJ to about 550 mJ, about 275 mJ to about 700 mJ, about 450 mJ to about 950 mJ, about 550 mJ to about 1,050 mJ, or about 700 mJ to about 1,150 mJ. In another example, the adhesive can have a minimum ignition energy (MIE) of at least 100 mJ, at least 250 mJ, at least 350 mJ, or at least 500 mJ. In another example, the adhesive can have a minimum ignition energy (MIE) of greater than 100 mJ, greater than 200 mJ, greater than 300 mJ, greater than 400 mJ, greater than 500 mJ, greater than 600 mJ, greater than 700 mJ, greater than 800 mJ, or greater than 900 mJ. In another example, the adhesive can have a minimum ignition energy (MIE) of at least 100 mJ, at least 250 mJ, at least 350 mJ, at least 500 mJ, at least 700 mJ, at least 850 mJ, or at least 1,000 mJ and up to about 1,500 mJ, about 2,000 mJ, about 3,000 mJ, about 4,000 mJ, about 5,000 mJ, about 6,000 mJ, about 7,000 mJ, about 8,000 mJ, about 9,000 mJ, or about 10,000 mJ.

The adhesive that includes the lignin material and the phenol-aldehyde resin and contains less than 10 wt % of water can have an explosion constant of less than 299 bar m/s, less than 200 bar m/s, less than 100 bar m/s, or less than 50 bar m/s and a minimum ignition energy (MIE) of greater than 100 mJ, greater than 200 mJ, greater than 300 mJ, greater than 400 mJ, greater than 500 mJ, greater than 600 mJ, greater than 700 mJ, greater than 800 mJ, or greater than 900 mJ. For example, the adhesive can have an explosion constant ($K_{st}$) of about 0 bar m/s to about 295 bar m/s, about 5 bar m/s to about 275 bar m/s, about 10 bar m/s to about 250 bar m/s, about 50 bar m/s to about 150 bar m/s, about 75 bar m/s to about 175 bar m/s, about 125 bar m/s to about 200 bar m/s, about 175 bar m/s to about 240 bar m/s, about 220 bar m/s to about 280 bar m/s, or about 125 bar m/s to about 190 bar m/s and a minimum ignition energy (MIE) of about 110 mJ to about 400 mJ, about 175 mJ to about 550 mJ, about 275 mJ to about 700 mJ, about 450 mJ to about 950 mJ, about 550 mJ to about 1,050 mJ, or about 700 mJ to about 1,150 mJ. In another example, the adhesive can have an explosion constant ($K_{st}$) of about 50 bar m/s to about 295 bar m/s and a minimum ignition energy (MIE) of about 1,000 mJ to about 10,000 mJ. In another example, the mixture can have an explosion constant ($K_{st}$) of about 100 bar m/s to about 200 bar m/s and a minimum ignition energy (MIE) of about 1,000 mJ to about 10,000 mJ.

The adhesive can be prepared via any desired method. For example, the adhesive can be prepared by blending, mixing, or otherwise combining the powdered lignin material and the powdered phenol-aldehyde resin. The powdered lignin material and the powdered phenol-aldehyde resin can each contain less than 10 wt % of a liquid, e.g., water. The adhesive can also contain less than 10 wt % of the liquid. In another example, the adhesive can be prepared by blending, mixing, or otherwise combining the powdered lignin material with a liquid phenol-aldehyde resin such as an aqueous phenol-formaldehyde resin to produce a first mixture. The first mixture can be dried to produce a dried particulate or adhesive. For example, the first mixture can be subjected to spray-drying, freeze drying, cryogenic drying, drum drying, pulse combustion drying, precipitation, air drying, dry spinning, vacuum drying, evaporation drying, oven drying, or any combination thereof to produce the adhesive. Depending on the particular drying process used, the dried adhesive can be reduced in size, if necessary, via grinding, milling, and/or other mechanical means. The adhesive can include less than 10 wt % of a liquid, e.g., water. In some embodiments, no heat is applied when the powdered lignin material and the powdered phenol-aldehyde resin are mixed to produce the adhesive. In some embodiments, the powdered lignin material and the powdered phenol-aldehyde resin can be mixed at about ambient temperature to produce the adhesive.

Spray drying refers to the process of producing a particulate solid product from a liquid mixture. The process can include spraying or atomizing the liquid mixture, e.g., forming small droplets, into a temperature controlled gas stream to evaporate the liquid from the atomized droplets and produce the dry particulate solid. The temperature of the liquid mixture during the spray-drying process can usually be close to or greater than the boiling temperature of the liquid. An outlet air temperature of about 60° C. to about 120° C. can be common. A dry particulate solid can contain less than 20 wt %, less than 15 wt %, less than 10 wt %, less than 5 wt %, less than 4 wt %, less than 3 wt %, or less than 2 wt % of water. The phenol-aldehyde resin or a mixture of a liquid phenol-aldehyde resin and the lignin material can be spray dried to produce a particulate solid product.

The adhesive can include one or more aldehyde compounds, e.g., formaldehyde, one or more phenolic compounds, e.g., phenol and/or resorcinol, and one or more lignin materials, e.g., kraft lignin. In one or more embodiments, the adhesive can include one or more aldehyde compounds, e.g., formaldehyde, one or more phenolic compounds, e.g., phenol and/or resorcinol, one or more phenol-aldehyde resins, e.g., phenol-formaldehyde, and one or more lignin materials, e.g., kraft lignin. The aldehyde compound and the phenolic compound can be reacted to produce the phenolic-aldehyde resin in the presence of the lignin material. In some embodiments, there is substantially no reaction between the phenolic compound and the lignin material within the adhesive. In some embodiments, there is substantially no reaction between the aldehyde compound and the lignin material within the adhesive. In some embodiments, when the aldehyde compound, phenolic compound, and phenol-aldehyde resin are present, there is substantially no reaction between the aldehyde compound and the lignin material, the phenolic compound and the lignin material, and/or the phenol-aldehyde resin and the lignin material.

As used herein, the term "substantially no reaction" means that the reagents or components are combined to produce a chemical mixture. In some embodiments, "substantially no reaction" means that less than about 5%, less than about 3%, or less than about 1%, by weight or by volume, of the aldehyde, if present, and the lignin material react with each other to form a reaction product. In some embodiments, less than about 5%, less than about 3%, or less than about 1%, by weight or by volume, of the phenol, if present, and the lignin material react to form a reaction product. In still other embodiments, less than about 5%, less than about 3%, or less than about 1%, by weight or by volume, of the phenol-aldehyde resin and the lignin material react to form a reaction product. In still other embodiments, the lignin material is blended with the phenol-formaldehyde resin to form a mixture and no reaction occurs between the lignin and the phenol-formaldehyde resin.

In one or more embodiments, the lignin material and the phenol-aldehyde resin in the adhesive can remain as separate or discrete components that have not reacted to form a reaction product. For example, the lignin material and the phenol-aldehyde resin cannot be represented by a single chemical formula, the lignin material and the phenol-aldehyde resin can be heterogeneously associated with one another, the lignin material and the phenol-aldehyde resin may or may not be uniformly dispersed together, and the lignin material and the phenol-aldehyde resin can be mechanically separated from one another. When the lignin material and the phenol-aldehyde resin are blended, mixed, or otherwise combined with one another to produce the adhesive, the lignin material and the phenol-aldehyde resin can be combined under conditions that do not promote or cause the two components to react or form a reaction product. For example, when the lignin material and the phenol-aldehyde resin are blended, mixed, or otherwise combined with one another at room temperature, e.g., about 25°, and room pressure, e.g., about 101 kPa, to produce the adhesive, the two components can remain as separate or discrete components that do not react to form a reaction product.

As used herein, the term "lignin material" refers to any polymeric material that is or includes lignin. In one or more embodiments, the lignin material may can be or include lignin as extracted from black liquor; hereinafter "kraft lignin". In one or more embodiments, the naturally occurring kraft lignin can be chemically modified during precipitation from black liquor. In one or more embodiments, the naturally occurring kraft lignin can be chemically modified prior to precipitation from black liquor. In one or more embodiments, naturally occurring lignin that has been chemically modified can include, but is not limited to, one or more organic functional groups and/or one or more inorganic functional groups Illustrative organic functional groups can include, but are not limited to, carboxyl, carbonyl, and alkenyl. Illustrative inorganic functional groups can include, but are not limited to, sodium, sulfate, and potassium. In one or more embodiments, the lignin material can be partially or entirely of a synthetic nature. In one or more embodiments, the lignin material can be partially or entirely of a synthetic nature. In other words, the lignin material can be lignin material that is not obtained directly or indirectly from a kraft process or a black liquor. For example, lignin material not obtained directly or indirectly from a kraft process or black liquor can include, but is not limited to, lignosulfonates, organosolv lignin, soda lignin, or any mixture thereof. In one or more embodiments, the lignin material can include or exclude cations and/or anions that would otherwise be present in naturally occurring lignin. Illustrative cations that are present in naturally occurring lignin can include, but are not limited to, sodium, potassium, calcium, or any combination thereof. Illustrative anions that are present in naturally occurring lignin can include, but are not limited to, carboxylate, sulfonate, sulfate, or any combination thereof. In one or more embodiments, the lignin material can have an ash content that differs from the ash content of a naturally occurring kraft lignin. For example, the lignin material can have an ash content that is lower than the ash content of a naturally occurring kraft lignin. In another example, the lignin material can have an ash content that is greater than the ash content of a naturally occurring kraft lignin.

Native or naturally occurring lignin is a high molecular weight phenylpropane polymer that is present in an amount of about 24 wt % to about 35 wt % in softwood and in an amount of about 17 wt % to about 25 wt % in hardwood. Native lignin is not soluble in water and functions to bond the cellulose fibers of wood together. In commercial kraft pulping processes, wood chips are soaked in an aqueous solution of sodium sulfide and sodium hydroxide at elevated temperatures for a period of time to enable the degradation of the native lignin into a water soluble lignin. The resulting aqueous solution of water soluble lignin is called "black liquor" and can be separated from remaining insoluble cellulose fibers. Black liquor has a pH value of about 13 to about 14. The water soluble lignin can be precipitated out of the black liquor by the addition of an acid such as sulfuric acid, nitric acid, and/or hydrochloric acid. In some commercial processes, the black liquor is first carbonated with carbon dioxide and then precipitated by the addition of sulfuric acid. The resulting precipitate is typically isolated by filtration, washed with additional aliquots of sulfuric acid, washed with water, and then allowed to dry. These treatment steps produce a lignin filter cake that can have a moisture content from a low of about 1 wt %, about 25 wt %, or about 45 wt % to a high of about 50 wt %, about 70 wt %, or about 75 wt %. For example, the lignin filter cake can have a moisture content of about 1 wt % to about 75 wt %, about 25 wt % to about 45 wt %, or about 50 wt % to about 70 wt %. The lignin filter cake can be dried to remove at least a portion of the water.

In one or more embodiments, the lignin material can be or include kraft lignin, alkali lignin, or a mixture thereof. Kraft lignin and alkali lignin are known materials of commerce. The CAS numbers for kraft lignin and alkali lignin are 8068-05-1 and 37203-80-8, respectively. The kraft lignin, alkali lignin, or a mixture of the kraft lignin and the alkali lignin can include less than 50 wt %, less than 45 wt %, less than 40 wt %, less than 37 wt %, less than 35 wt %, less than 33 wt %, less than 30 wt %, less than 27 wt %, less than 35 wt %, less than 23 wt %, less than 20 wt %, less than 15 wt %, less than 10 wt %, less than 7 wt %, less than 6 wt %, less than 5 wt %, less than 4 wt %, less than 3 wt %, less than 2 wt %, less than 1 wt %, or less than 0.5 wt % of water, based on the total weight of the kraft lignin and/or the alkali lignin. In other embodiments, the lignin material can be lignin material that is not kraft lignin. For example, the lignin material can be a low-purity lignin, a lignosulfonate, an organosolv lignin, or a high-grade lignin. In still other embodiments the lignin material can be or include kraft lignin, low-purity lignin, a lignosulfonate, an organosolv lignin, a high-grade lignin, or any mixture thereof.

Depending on the particular lignin material, the amount of ash contained in the lignin material can widely vary. For example, the lignin material can include about 1 wt %, about 1.5 wt %, about 2 wt %, about 2.5 wt %, or about 3 wt % to about 4 wt %, about 5 wt %, about 6 wt %, about 7 wt %, about 8 wt %, about 9 wt %, about 10 wt %, or more of ash. In one or more embodiments, the lignin material can be or include kraft lignin and the kraft lignin can include less than 3 wt %, less than 2.7 wt %, less than 2.5 wt %, less than 2.3 wt %, less than 2 wt %, less than 1.7 wt %, less than 1.5 wt %, less than 1.3 wt %, less than 1 wt %, less than 0.9 wt %, less than 0.8 wt %, less than 0.7 wt % less than 0.6 wt %, less than 0.5 wt %, less than 0.4 wt %, less than 0.3 wt %, less than 0.2 wt %, less than 0.1 wt %, less than 0.07 wt %, less than 0.05 wt %, or less than 0.02 wt % of ash, based on a dry weight of the kraft lignin. The ash content of the lignin material can be measured according to ASTM D2584-11: Standard Test Method for Ignition Loss of Cured Reinforced Resins.

Depending on the particular lignin material, the amount of sulfur contained in the lignin material can widely vary. For example, the lignin material can include about 1 wt %, about 1.5 wt %, about 2 wt %, about 2.5 wt %, or about 3 wt % to about 4 wt %, about 5 wt %, about 6 wt %, about 7 wt %, about 8 wt %, about 9 wt %, about 10 wt %, or more of sulfur. In one or more embodiments, the lignin material can be or include kraft lignin and the kraft lignin can contain less than 5 wt % of sulfur, less than 4.5 wt % of sulfur, less than 4 wt % of sulfur, less than 3.5 wt % of sulfur, less than 3 wt % of sulfur, less than 2.7 wt % of sulfur, less than 2.5 wt % of sulfur, less than 2.3 wt % of sulfur, less than 2 wt % of sulfur, less than 1.7 wt % of sulfur, or less than 1.5 wt % of sulfur. The sulfur content of the lignin material can be measured or calculated using elemental analysis techniques. For example, the sulfur content of the lignin material can be indirectly determined or estimated using CHN analysis, which can be accomplished by combustion analysis. More particularly, a sample of the lignin material can be burned in an excess of oxygen, and various traps can collect the combustion products, such as carbon dioxide, water, and nitric oxide. The masses of these combustion products can be used to calculate the composition of the unknown sample.

In one or more embodiments, a ratio of aromatic carbon atoms plus alkenic carbon atoms to aliphatic carbon atoms (aromatic carbon atoms+alkenic carbon atoms:aliphatic carbon atoms) in the lignin material can be about 1:1, about 1.3:1, about 1.5:1, about 1.7:1, about 2:1, about 2.3:1, about 2.5:1, or about 2.7:1 to about 3.5:1, about 3.7:1, about 4:1, about 4.3:1, about 4.5:1, about 4.7:1, about 5:1, about 5.3:1, about 5.5:1, about 5.7:1, or about 6:1, based on quantitative analysis of $^{13}$C NMR spectra of the lignin material. In one example, the lignin material can have a ratio of aromatic carbon atoms plus alkenic carbon atoms to aliphatic carbon atoms of at least 2.5:1, at least 2.7:1, at least 3:1, at least 3.3:1, at least 3.5:1, at least 3.7:1, at least 4:1, at least 4.3:1, at least 4.5:1, at least 4.7:1, or at least 5:1 to about 5.3:1, about 5.5:1, about 5.7:1, or about 6:1, based on quantitative analysis of $^{13}$C NMR spectra of the lignin material. In another example, the lignin material can have a ratio of aromatic carbon atoms plus alkenic carbon atoms to aliphatic carbon atoms of about 1:1 to about 2:1, about 1.1:1 to about 1.9:1, about 1.2:1 to about 1.8:1, about 1.3:1 to about 1.7:1, about 1.4:1 to about 1.6:1, based on quantitative analysis of $^{13}$C NMR spectra of the lignin material. In one or more embodiments, lignin material can be or include kraft lignin and the kraft lignin can have a ratio of aromatic carbon atoms plus alkenic carbon atoms to aliphatic carbon atoms of about at least 2.5:1, at least 2.7:1, at least 3:1, at least 3.3:1, at least 3.5:1, at least 3.7:1, at least 4:1, at least 4.3:1, at least 4.5:1, at least 4.7:1, or at least 5:1 to about 5.3:1, about 5.5:1, about 5.7:1, or about 6:1, based on quantitative analysis of $^{13}$C NMR spectra of the kraft lignin.

In one or more embodiments, the lignin material can be a solid, e.g., a solid powder. In one or more embodiments, the lignin material can be in the form of a liquid solution, mixture, or dispersion. In one or more embodiments, the lignin material can be in the form of a semi-solid. Lignin material in the form of a semi-solid means that the lignin material includes greater than about 1 wt % or greater than about 1 vol % of solid, undissolved lignin material within a liquid solution. For example, semi-solid lignin material can include about 1% to about 20%, about 1% to about 10%, about 1% to about 5%, or about 1% to about 3% solid material by weight of the liquid solution or by volume of the liquid solution.

In one or more embodiments, the lignin material can have a water or moisture content of less than 50 wt %, less than 45 wt %, less than 40 wt %, less than 37 wt %, less than 35 wt %, less than 33 wt %, less than 30 wt %, less than 27 wt %, less than 35 wt %, less than 23 wt %, less than 20 wt %, less than 17 wt %, less than 15 wt %, less than 13 wt %, less than 10 wt %, less than 9 wt %, less than 8 wt %, less than 7 wt %, less than 6 wt %, less than 5 wt %, less than 4 wt %, less than 3 wt %, less than 2 wt %, less than 1 wt %, or less than 0.5 wt %. For example, the lignin material can have a water or moisture content of about 0.5 wt % to about 5.5 wt %, about 1 wt % to about 4.5 wt %, about 1.5 wt % to about 3 wt %, about 2 wt % to about 4 wt %, about 1.7 wt % to about 3.3 wt %, about 1 wt % to about 2.5 wt %, about 0.7 wt % to about 3.5 wt %, about 3 wt % to about 6 wt %, about 4 wt % to about 8 wt %, about 5 wt % to about 7 wt %, about 6 wt % to about 9 wt %, or about 1 wt % to about 9.5 wt %. In another example, the lignin material can include about 2 wt %, about 5 wt %, about 7 wt %, about 10 wt %, 15 wt %, about 20 wt %, or about 25 wt % to about 30 wt %, about 35 wt %, about 40 wt %, or about 45 wt % of a liquid, e.g., water, and about 55 w % to about 85 wt % of solid material by weight of the lignin material.

The lignin material can have an average particle size from a low of about 1 μm, about 5 μm, about 10 μm, about 15 μm, about 20 μm, or about 25 μm to a high of about 30 μm, about 40 μm, about 50 μm, about 60 μm, about 70 μm, about 80 μm, about 90 μm, or about 100 μm. For example, the lignin material can have an average particle size of about 1 μm to about 80 μm, about 2 μm to about 40 μm, about 3 μm to about 30 μm, about 1 μm to about 15 μm, about 10 μm to about 25 μm, about 20 μm to about 40 μm, about 35 μm to about 65 μm, about 45 μm to about 75 μm, or about 55 μm to about 75 μm, or about 60 μm to about 95 μm. In another example, the lignin material can have an average particle size of less than 75 μm, less than 65 μm, less than 55 μm, less than 45 μm, less than 40 μm, less than 35 μm, less than 30 μm, less than 25 μm, less than 20 μm, or less than 15 μm.

The lignin material can have a maximum particle size of 200 μm, 180 μm, 160 μm, 140 μm, 120 μm, 100 μm, 90 μm, 80 μm, 70 μm, 60 μm, 50 μm, or 40 μm. The lignin material can have a maximum particle size of less than 200 μm, less than 180 μm, less than 160 μm, less than 140 μm, less than 120 μm, less than 100 μm, less than 90 μm, less than 80 μm, less than 70 μm, less than 60 μm, less than 50 μm, or less than 40 μm and greater than about 1 μm, about 2 μm, about 3 μm, about 5 μm, or about 10 μm.

In one or more embodiments, the lignin material can have an average particle size from a low of about 1 μm, about 5 μm, about 10 μm, about 15 μm, about 20 μm, or about 25 μm to a high of about 30 μm, about 40 μm, about 50 μm, about 60 μm, about 70 μm, about 80 μm, about 90 μm, or about 100 μm and a maximum particle size of 200 μm, 180 μm, 160 μm, 140 μm, 120 μm, 100 μm, 90 μm, 80 μm, 70 μm, 60 μm, 50 μm, or 40 μm. For example, the lignin material can have an average particle size of about 1 μm to about 80 μm and a maximum particle size of 200 μm. In another example, the lignin material can have an average particle size of about 2 μm to about 40 μm and a maximum particle size of 100 μm. In another example, the lignin material can have an average particle size of about 3 μm to about 30 μm and a maximum particle size of 80 μm.

The average particle size and the maximum particle size of the lignin material, the phenol-aldehyde resin, and the adhesive that includes the powdered lignin material and the powdered phenol-aldehyde resin can be measured with a Cilas 990D Particle Size Analyzer configured with Particle Expert software. A vacuum cleaner equipped with a HEPA filter or equivalent capable of capturing the sample to be measured can be used. It should be ensured that the feeder mechanism, venturi block, and lenses are completely clean. Calibration should be unnecessary unless the detector or laser has been repaired or replaced. If calibration is required, the procedure can use Whitehouse Certified Glass Beads or other material meeting the requirements of ISO 13320-1. The following steps can be followed to measure the average and maximum particle sizes. First, in the Particle Expert software, the analysis button can be clicked on and the sample information can be entered. Second, the "background" can be clicked on and the system can be allowed to perform an ambient measurement. This step is unnecessary for subsequent measurements, as a background measurement will automatically be taken for every sample. Third, it should be ensured that the feeder bowl and control ring are firmly tightened to the instrument and that the slide is centered over the feed funnel. Fourth, after the background measurement has been completed, a pipet or scoop can be used to transfer about 2 grams of material to the feed bowl. It should be ensured that the sample is evenly mixed and has not settled. Fifth, the settings for the feed vibrator can be selected such that during operation, the obscuration should remain between 5% and 20%. Sixth, "run sample" can be clicked. Once the analysis has completed, the feed control ring and feeder bowl can be removed. Any remaining material can be disposed of. The feeder bowl can be wiped clean with a dry cloth. Seventh, after the analysis has completed, the results window will appear. Specific size results will be available on the data tab. To obtain the fraction of total product within a particular diameter range, the cumulative value at the bottom of the range can be subtracted from the cumulative value at the top of the range.

As used herein, the term "phenol-aldehyde resin" refers to a synthetic polymer obtained from the reaction of one or more phenolic compounds with one or more aldehyde compounds. Any known method capable of producing a phenol-aldehyde resin can be used. Suitable methods for synthesizing a phenol-aldehyde resin can include both single step processes and multi-step or "programmed" processes (i.e., staged monomer/catalyst addition). While batch operations are the standard, continuous processes can also be used. Standard conditions, procedures and reactants for making a phenol-aldehyde resins, e.g., phenol-formaldehyde resins, well-known to those skilled in the art.

In one or more embodiments, a weight ratio or a volume ratio of the aldehyde compound to the phenolic compound in the phenol-aldehyde resin can be about 2:1 to about 1:2, about 3:1 to about 1:3, about 4:1 to about 1:4, about 5:1 to about 1:5, about 6:1 to about 1:6, about 7:1 to about 1:7, about 8:1 to about 1:8, about 1:9 to about 9:1, or about 1:10 to about 10:1. In one or more embodiments, a molar ratio of the aldehyde compound to the phenolic compound in the phenol-aldehyde resin can be about 1.5:1 to about 3:1, about 1.9:1 to about 2.6:1, about 2:1 to about 2.5:1, about 2.1:1 to about 2.6:1, about 2.2:1 to about 2.5:1, or about 2.3:1 to about 2.5:1.

The aldehyde compound can be or include one or more substituted aldehyde compounds, one or more unsubstituted aldehyde compounds, or any mixture of substituted and/or unsubstituted aldehyde compounds. Illustrative aldehyde compounds can include, but are not limited to, aldehydes having the chemical formula RCHO, where R is hydrogen or a hydrocarbyl group. Illustrative hydrocarbyl groups can include 1 carbon atom to about 8 carbon atoms. Suitable aldehyde compounds can also include the so-called masked aldehydes or aldehyde equivalents, such as acetals or hemiacetals. Illustrative aldehyde compounds can include, but are not limited to, formaldehyde, paraformaldehyde, cinnamaldehyde, tolualdehyde, acetaldehyde, propionaldehyde, butyraldehyde, furfural, benzaldehyde, retinaldehyde, glyoxal, malondialdehyde, succindialdehyde, glutaraldehyde, phthaldehyde, derivatives thereof, or any mixture thereof. Still other suitable formaldehyde compounds can include formaldehyde present in a prepolymer or pre-condensate such as urea-formaldehyde precondensate (UFC). In at least one embodiment, the aldehyde compound can be or include formaldehyde.

The phenolic compound can be or include any one or more of a number of phenolic compounds. Illustrative phenolic compounds can be or include phenol, one or more substituted phenol compounds, one or more unsubstituted phenol compounds, or any combination or mixture of substituted and/or unsubstituted phenol compounds. For example, the phenolic component can be or include phenol itself (monohydroxybenzene). Illustrative substituted phenolic compounds can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol, or any mixture thereof. Dihydric phenols such as catechol, resorcinol, hydroquinone, bisphenol A and bisphenol F also can also be used. For example, the phenolic compound can be or include, but is not limited to, resorcinol, phenol, catechol, hydroquinone, pyrogallol, 5-methylresorcinol, 5-ethylresorcinol, 5-propylresorcinol, 4-methylresorcinol, 4-ethylresorcinol, 4-propylresorcinol, resorcinol monobenzoate, resorcinol monosinate, resorcinol diphenyl ether, resorcinol monomethyl ether, resorcinol monoacetate, resorcinol dimethyl ether, phloroglucinol, benzoylresorcinol, resorcinol rosinate, alkyl substituted resorcinol, aralkyl substituted resorcinol, 2-methylresorcinol, phloroglucinol, 1,2,4-benzenetriol, 3,5-dihydroxybenzaldehyde, 2,4-dihydroxybenzaldehyde, 4-ethylresorcinol, 2,5-dimethylresorcinol, 5-methylbenzene-1,2,3-triol, 3,5-dihydroxybenzyl alcohol, 2,4,6-trihydroxytoluene, 4-chlororesorcinol, 2',6'-dihydroxyacetophenone, 2',4'-dihydroxyacetophenone, 3',5'-dihydroxyacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 1,3-dihydroxynaphthalene, 2',4'-dihydroxypropiophenone, 2',4'-dihydroxy-6'-methylacetophenone, 1-(2,6-dihydroxy-3-methylphenyl)ethanone, 3-methyl 3,5-dihydroxybenzoate, methyl 2,4-dihydroxybenzoate, gallacetophenone, 2,4-dihydroxy-3-methylbenzoic acid, 2,6-dihydroxy-4-methylbenzoic acid, methyl 2,6-dihydroxybenzoate, 2-methyl-4-nitroresorcinol, 2,4,5-trihydroxybenzoic acid, 3,4,5-trihydroxybenzoic acid, 2,3,4-trihydroxybenzoic acid, 2,4,6-trihydroxybenzoic acid, 2-nitrophloroglucinol, or any mixture thereof. In at least one embodiment, the phenolic compound can be or include phenol. The phenolic compound can include any combination or mixture of two or more phenolic compounds combined with one another and/or added independent of one another to the reaction mixture.

In one or more embodiments, the adhesive can also include one or more other aldehyde-based resins that are different than the phenol-aldehyde based resin. Illustrative aldehyde-based resins can include, but are not limited to, one or more urea-aldehyde resins, one or more melamine-aldehyde resins, one or more other phenol-aldehyde resins, e.g., phenol-formaldehyde novolac resin and/or phenol-formaldehyde resole resins, one or more resorcinol-aldehyde resins, one or more phenol-resorcinol-aldehyde resins, one or more melamine-urea-aldehyde resins, one or more phenol-urea-aldehyde resins, or any mixture thereof. In some embodiments, the aldehyde-based resin can be or include a phenol-formaldehyde resin. The phenol-formaldehyde resin can also be or include a phenol-formaldehyde resole resin. In still other embodiments, the aldehyde-based resin does not include urea. In yet other embodiments, the aldehyde-based resin does not include melamine. In another embodiment, the aldehyde-based resin does not include urea or melamine.

The powdered phenol-aldehyde resin can have a water or moisture content of less than 20 wt %, less than 15 wt %, less than 10 wt %, less than 7 wt %, less than 6 wt %, less than 5 wt %, less than 4 wt %, less than 3 wt %, less than 2 wt %, less than 1 wt %, or less than 0.5 wt %. For example, the powdered phenol-aldehyde resin can have a water or moisture content of about 0.5 wt % to about 3 wt %, about 1 wt % to about 2 wt %, about 0.5 wt % to about 1.5 wt %, about 1.5 wt % to about 3.5 wt %, about 1 wt % to about 2.5 wt %, about 0.7 wt % to about 3.5 wt %, about 3 wt % to about 6 wt %, about 4 wt % to about 8 wt %, about 5 wt % to about 7 wt %, about 6 wt % to about 9 wt %, or about 1 wt % to about 9.5 wt %.

The powdered phenol-aldehyde resin can have an average particle size from a low of about 10 µm, about 20 µm, about 30 µm, about 40 µm, about 50 µm, or about 60 µm to a high of about 80 µm, about 100, µm, about 130 µm, about 150 µm, about 170 µm, about 200 µm, or about 220 µm. For example, the powdered phenol-aldehyde resin can have an average particle size of about 20 µm to about 200 µm, about 30 µm to about 100 µm, about 40 µm to about 80 µm, about 25 µm to about 65 µm, about 45 µm to about 90 µm about 65 µm to about 110 µm, about 105 µm to about 140 µm, about 125 µm to about 165 µm, about 145 µm to about 185 µm, or about 165 µm to about 205 µm. In another example, the powdered phenol-aldehyde resin can have an average particle size of less than 200 µm, less than 160 µm, less than 140 µm, less than 120 µm, less than 100 µm, less than 90 µm, less than 80 µm, less than 70 µm, or less than 60 µm.

The phenol-aldehyde resin can have a maximum particle size of 500 µm, 450 µm, 400 µm, 350 µm, 300 µm, 275 µm, 250 µm, 225 µm, 200 µm, 175 µm, 150 µm, 125 µm, or 100 µm. The phenol-aldehyde resin can have a maximum particle size of less than 500 µm, less than 450 µm, less than 400 µm, less than 350 µm, less than 300 µm, less than 275 µm, less than 250 µm, less than 225 µm, less than 200 µm, less than 175 µm, less than 150 µm, less than 125 µm, or less than 100 µm.

In one or more embodiments, the phenol-aldehyde resin can have an average particle size from a low of about 10 µm, about 20 µm, about 30 µm, about 40 µm, about 50 µm, or about 60 µm to a high of about 80 µm, about 100, µm, about 130 µm, about 150 µm, about 170 µm, about 200 µm, or about 220 µm and a maximum particle size of 500 µm, 450 µm, 400 µm, 350 µm, 300 µm, 275 µm, 250 µm, 225 µm, 200 µm, 175 µm, 150 µm, 125 µm, or 100 µm. For example, the phenol-aldehyde resin can have an average particle size of about 20 µm to about 200 µm and a maximum particle size of 500 µm. In another example, the phenol-aldehyde resin can have an average particle size of about 30 µm to about 100 µm and a maximum particle size of 300 µm. In another example, the phenol-aldehyde resin can have an average particle size of about 40 µm to about 80 µm and a maximum particle size of 200 µm.

In one or more embodiments, the mixture can include the lignin material that can have an average particle size from a low of about 1 µm, about 5 µm, about 10 µm, about 15 µm, about 20 µm, or about 25 µm to a high of about 30 µm, about 40 µm, about 50 µm, about 60 µm, about 70 µm, about 80 µm, about 90 µm, or about 100 µm and a maximum particle size of 200 µm, 180 µm, 160 µm, 140 µm, 120 µm, 100 µm, 90 µm, 80 µm, 70 µm, 60 µm, 50 µm, or 40 µm and the phenol-aldehyde resin that can have an average particle size from a low of about 10 µm, about 20 µm, about 30 µm, about 40 µm, about 50 µm, or about 60 µm to a high of about 80 µm, about 100, µm, about 130 µm, about 150 µm, about 170 µm, about 200 µm, or about 220 µm and a maximum particle size of 500 µm, 450 µm, 400 µm, 350 µm, 300 µm, 275 µm, 250 µm, 225 µm, 200 µm, 175 µm, 150 µm, 125 µm, or 100 µm. In one or more embodiments, the mixture can include the lignin material that can have an average particle size of less than 75 µm, less than 65 µm, less than 55 µm, less than 45 µm, less than 40 µm, less than 35 µm, less than 30 µm, less than 25 µm, less than 20 µm, or less than 15 µm and a maximum particle size of 200 µm, 180 µm, 160 µm, 140 µm, 120 µm, 100 µm, 90 µm, 80 µm, 70 µm, 60 µm, 50 µm, or 40 µm and the phenol-aldehyde resin that can have an average particle size of less than 200 µm, less than 160 µm, less than 140 µm, less than 120 µm, less than 100 µm, less than 90 µm, less than 80 µm, less than 70 µm, or less than 60 µm and a maximum particle size of 500 µm, 450 µm, 400 µm, 350 µm, 300 µm, 275 µm, 250 µm, 225 µm, 200 µm, 175 µm, 150 µm, 125 µm, or 100 µm.

In at least one embodiment, the adhesive can include kraft lignin and the phenol-aldehyde resin and can have a moisture content of less than 10 wt %, based on the total weight of the mixture. The kraft lignin can include less than 3 wt %, less than 2.5 wt %, less than 2 wt %, less than 1.7 wt %, less than 1.5 wt %, less than 1.3 wt %, or less than 1 wt % of ash and less than 5 wt %, less than 4 wt %, less than 3 wt %, less than 2 wt %, or less than 1.5 wt % of sulfur. The kraft lignin can have an average particle size from a low of about 1 µm, about 5 µm, about 10 µm, about 15 µm, about 20 µm, or about 25 µm to a high of about 30 µm, about 40 µm, about 50 µm, about 60 µm, about 70 µm, about 80 µm, about 90 µm, or about 100 µm. The kraft lignin can have a maximum particle size of 200 µm, 180 µm, 160 µm, 140 µm, 120 µm, 100 µm, 90 µm, 80 µm, 70 µm, 60 µm, 50 µm, or 40 µm. The phenol-aldehyde resin can have an average particle size from a low of about 10 µm, about 20 µm, about 30 µm, about 40 µm, about 50 µm, or about 60 µm to a high of about 80 µm, about 100, µm, about 130 µm, about 150 µm, about 170 µm, about 200 µm, or about 220 µm. The phenol-aldehyde resin can have a maximum particle size of 500 µm, 450 µm, 400 µm, 350 µm, 300 µm, 275 µm, 250 µm, 225 µm, 200 µm, 175 µm, 150 µm, 125 µm, or 100 µm. The mixture can have an explosion constant of less than 299 bar m/s, less than 200 bar m/s, less than 100 bar m/s, or less than 50 bar m/s and a minimum ignition energy (MIE) of greater than 100 mJ, greater than 200 mJ, greater than 300 mJ, greater than 400 mJ, greater than 500 mJ, greater than 600 mJ, greater than 700 mJ, greater than 800 mJ, or greater than 900 mJ. In another example, the mixture can have an explosion constant ($K_{st}$) of about 50 bar m/s to about 295 bar m/s and a minimum ignition energy (MIE) of about 1,000 mJ to about 10,000 mJ. In another example, the mixture can have an explosion constant ($K_{st}$) of about 100 bar m/s to about 200 bar m/s and a minimum ignition energy (MIE) of about 1,000 mJ to about 10,000 mJ.

In one or more embodiments, the adhesive that includes the one or more lignin materials and the one or more phenol-aldehyde resins can further include one or more fillers. As used herein, the term "filler" refers to materials that can be added to the adhesive that occupy volume but do not contribute or do not substantially contribute to bonding properties of the mixture. Suitable fillers include, but are not limited to, one or more nut shells, one or more seed shells, one or more fruit pits, one or more animal bones, milwhite, one or more clays, one or more glasses, one or more inorganic oxides such as silica and/or alumina, or any mixture thereof. The filler can be ground, crushed, pulverized, other otherwise reduced into particulate form. The filler can be blended, mixed, or otherwise combined with a mixture of the lignin material and the phenol-aldehyde resin to produce the adhesive. The filler can be blended, mixed, or otherwise combined with the lignin material to produce an intermediate mixture and the intermediate mixture can be blended, mixed, or otherwise combined with the phenol-aldehyde resin to produce the adhesive. The filler can be blended, mixed, or otherwise combined with the phenol-aldehyde resin to produce an intermediate mixture and the intermediate mixture can be blended, mixed, or otherwise combined with the lignin material to produce the adhesive.

Illustrative nut shells include, but are not limited to, walnut shells, pecan shells, almond shells, ivory nut shells, brazil nut shells, ground nut (peanut) shells, pine nut shells, cashew nut shells, sunflower seed shells, Filbert nut (hazel nut) shells, macadamia nut shells, soy nut shells, pistachio nut shells, pumpkin seed shells, or the like, or any mixture thereof. Illustrative seed shells (including fruit pits), can include, but are not limited to, the seed shells of fruit, e.g., plum, peach, cherry, apricot, olive, mango, jackfruit, guava, custard apples, pomegranates, and watermelon, ground or crushed seed shells of other plants such as maize (e.g., corn cobs or corn kernels), wheat, rice, jowar, or the like, or any mixture thereof. Other examples of suitable fillers include, but are not limited to, wheat shell, corn husk, peanut shell, or any combination thereof. In an embodiment, the nut shells and/or seed shells may be ground or powdered, e.g., in a flour form. In embodiments, suitable flours derived from nut shells may include, but are not limited to, walnut shell flour, pecan shell flour, almond shell flour, or any mixture thereof. In other embodiments, flour derived from the seed shells of fruits may include, but are not limited to, apricot pit shell flour, peach pit shell flour, prune pit shell flour, or any mixture thereof.

In one or more embodiments, the adhesive that includes the one or more lignin materials and the one or more phenol-aldehyde resins can further include one or more extenders. As used herein, the term "extender" refers to materials that can be added to the adhesive that occupy volume and also contribute to bonding properties of the mixture. One example of a suitable extender can be a material that includes one or more proteins. The protein can contribute to the crosslinking of the mixture during at least partial cure thereof. Suitable extenders can include, but are not limited to, corn flour, soy flour, wheat flour, spray dried blood, or any mixture thereof.

Illustrative soy flour can be or include a raw soy protein and/or a soy protein modified as discussed and described in U.S. Pat. No. 6,497,760. Raw soy protein maybe in the form of ground whole beans (including the hulls, oil, protein, minerals, etc.), a meal (extracted or partially extracted), a flour (i.e., generally containing less than about 1.5% oil and about 30-35% carbo-hydrate), or an isolate (i.e., a substantially pure protein flour containing less than about 0.5% oil and less than about 5% carbohydrate). Suitable soy protein can be derived from any source of soy protein such as soybean concentrate or soybean meal. Protein-rich soybean-derived flours, such as soy protein isolate, protein concentrate, and ordinary defatted soy flour, which contain in the range of about 20-95% protein, may also be used. The source of soy protein (soy flour) may be substantially free of functional urease. Information on soy protein can be found in, for example, Kirk-Othmer, Encyclopedia of Chemical Technology, Fourth Edition, Volume 22, pp. 591-619 (1997). Modified soy protein may be modified with either of two classes of modifiers. The first class of modifiers may include saturated and unsaturated alkali metal C8-C22 sulfate and sulfonate salts. In some embodiments, modifiers in this class may be sodium dodecyl sulfate and sodium dodecylbenzene sulfonate. The second class of modifiers includes compounds having the formula $R_2NC(=X)NR_2$, where each R group may be individually selected from the group consisting of —H and $C_1$-$C_4$ saturated and unsaturated groups, and —X may be selected from the group consisting of O, NH, and S. The $C_1$-$C_4$ saturated groups refer to alkyl groups (both straight and branched chain) and the unsaturated groups refer to alkenyl and alkynyl groups (both straight and branched chain). In some embodiments, modifiers in the second group include, but are not limited to, urea and guanidine hydrochloride. Other suitable extenders can include, but are not limited to, those discussed and described in U.S. Pat. Nos. 2,507,465; 2,492,510; 2,781,286; 3,285,805; 3,957,703; 4,070,314; 4,244,846; and 4,778,530.

The fillers and/or extenders can have an average particle size from a low of about 0.1 μm to a high of about 100 μm. For example, the average particle size of the fillers and/or extenders can be from about 1 μm, about 3 μm, about 5 μm, about 8 μm, or about 10 μm to about 30 μm, about 40 μm, about 50 μm, or about 60 μm. In another example, the average particle size of the fillers and/or extenders can be from about 7 μm to about 30 μm, about 10 μm to about 30 μm, about 20 μm to about 35 μm, about 0.1 μm to about 10 μm, about 5 μm to about 45 μm, about 15 μm to about 35 μm, or about 10 μm to about 50 μm. The average particle size of the filler and/or extender, if present, can be measured in the same manner discussed and described above with regard to the lignin material and the phenol-aldehyde resin.

In one or more embodiments, the adhesive can include both the one or more fillers and the one or more extenders. If the adhesive includes both the filler and the extender, the amount of the filler in the mixture can be from about 0.1 wt % to about 99.9 wt %, based on the combined weight of the filler and the extender. In another example, if the adhesive includes both the filler and the extender, the amount of the filler can be from a low of about 0.5 wt %, about 1 wt %, about 5 wt %, about 10 wt %, or about 20 wt % to a high of about 30 wt %, about 40 wt %, about 50 wt %, about 60 wt %, about 70 wt %, about 80 wt %, about 90 wt %, or about 95 wt %, based on the combined weight of the filler and the extender.

The adhesive can also include one or more additives or modifiers. Illustrative additives or modifiers can include, but are not limited to, catalysts, cure promoters or accelerants (e.g., alkali metal and alkaline earth metal carbonates and hydroxides, such as sodium hydroxide), thickeners, adduct-forming agents (e.g., urea), tack promoters (e.g., borax), foaming agents, defoamers, waxes such as slack wax, release agents, dyes, fire retardants, formaldehyde scavengers, surfactants, or any mixture thereof.

The amount of any one of the additives combined or otherwise added to the adhesive can be from about 0.1 wt % to about 40 wt %, based on the combined weight of the lignin material, the phenol-aldehyde resin, and the additive. For example, the adhesive can contain from a low of about 0.3 wt %, about 0.5 wt %, or about 1 wt % to a high of about 3 wt %, about 5 wt %, about 7 wt %, about 9 wt %, about 11 wt %, about 13 wt %, about 15 wt %, about 20 wt %, about 25 wt %, or about 30 wt % of the additive(s), based on the total weight of the lignin material, the phenol-aldehyde resin, and the additive(s).

In one or more embodiments, a lignocellulosic or wood-based composite product or structure can be made by combining a plurality of lignocellulosic substrates and the adhesive that includes the lignin material and the phenol-aldehyde resin and at least partially curing the phenol-aldehyde resin. The adhesive can include less than 10 wt % of water based on a total weight of the mixture. The adhesive can be mixed, blended, sprayed, or otherwise contacted with the lignocellulosic substrate(s) to produce a resinated furnish. The phenol-aldehyde resin can be at least partially cured, e.g., by heating the resinated furnish, to produce the composite product or structure.

As used herein, the terms "curing," "cured," "at least partially curing," "at least partially cured," and similar terms are intended to refer to the structural and/or morphological change that occurs in the adhesive, such as by covalent chemical reaction (crosslinking), ionic interaction or clustering, phase transformation or inversion, and/or hydrogen bonding when the is subjected to conditions sufficient, e.g., sufficiently heated, to cause the properties of a flexible, porous substrate, such as a nonwoven mat or blanket of lignocellulose substrates and/or a rigid or semi-rigid substrate, such as a wood or other lignocellulose containing board or sheet, to which an effective amount of the adhesive has been applied, to be altered.

The adhesive can be used to make composite lignocellulosic products having one or more comparable or improved properties as a comparative composite lignocellulosic product made the same way, but with the powdered phenol-aldehyde resin alone. For example, the adhesive can produce composite lignocellulose products having comparable, the same, or greater internal bond strength. Other properties that can be comparable, the same, or greater include, but are not limited to, boiled internal bond, water soak, thickness swelling, water absorption, D-4 testing, bending testing, and cycle testing, or any combination thereof. Illustrative composite lignocellulose products can include, but are not limited to, oriented strand boards, particleboards, structural timber, hard board, medium density board, engineered lumber, glued laminated timber, plywood, fiberboards, wafer boards, pressed wood, wood-based panels, veneers, and the like.

In one or more embodiments, the adhesive that includes the lignin material and the phenol-aldehyde resin and has a moisture concentration of less than 10 wt % can bond lignocellulose substrates in a substantially similar way as compared to a traditional phenol-aldehyde resin that does not include the lignin material. The traditional phenol-aldehyde resin can be the same phenol-aldehyde resin as in the adhesive, but the lignin material can be absent therefrom. The amount of the adhesive and the amount of the traditional phenol-aldehyde resin applied to the lignocellulose substrates can be the same. As such, the adhesive would apply less phenol-formaldehyde resin as compared to the product made with the traditional phenol-aldehyde resin. In some embodiments, an engineered wood product prepared using the adhesive can have at least one physical property that is substantially similar to the physical property of a comparable engineered wood product prepared using the traditional phenol-aldehyde resin that does not include the lignin material. As used herein, the term "substantially similar" with regard to the bonding of wood means that the adhesive, when used to prepare engineered wood, results in an engineered wood product that has one or more quantifiable properties that are at least 90%, at least 95%, at least 98%, or at least 99% of the quantifiable property observed for a comparable engineered wood material prepared with the same phenol-aldehyde resin as in the adhesive except the lignin material is absent therefrom. Quantifiable properties of engineered wood products include, but are not limited to, those discussed and described in the ASTM D1037 standardized test, i.e., internal bond, boiled internal bond, water soak, thickness swelling, water absorption, D-4 testing, bending testing, and cycle testing.

Illustrative lignocellulosic or wood-based composite products or structures can include, but are not limited to, oriented strand boards, particleboards, structural timber, hard board, medium density board, engineered lumber, glued laminated timber, plywood, fiberboards, pressed wood, wood-based panels, veneers, and the like. In one example, an oriented strand board can be made by combining the adhesive with a plurality of wooden strands to produce a resinated furnish. In another example, a particleboard can be made by combining the adhesive and the wood chips, sawmill shavings, or saw dust to produce a resinated furnish. In another example, a plywood can be made by contacting a plurality of sheets or veneers of wood with the adhesive to produce a structure having the mixture disposed between at least two sheets of wood. In another example, a fiberboard can be made by combining the adhesive and a plurality of wood fibers to produce a resinated fiber. The adhesive can include the one or more lignin materials and the one or more phenol-aldehyde resins as discussed and described above.

In one or more embodiments, lignocellulosic or wood-based composite products such as particle board, fiberboard, plywood, and oriented strand board, the amount of the adhesive applied to the lignocellulosic substrates can be from a low of about 1 wt %, about 1.2 wt %, about 1.4 wt %, about 1.6 wt %, about 1.8 wt %, about 2 wt %, about 3 wt %, about 4 wt %, about 5 wt % or about 6 wt % to a high of about 10 wt %, about 12 wt %, about 15 wt %, or about 20 wt %, based on the combined weight of the lignocellulosic substrates and the adhesive mixture. For example, the amount of the powdered adhesive that can be applied to the lignocellulosic substrates can be about 0.5 wt % to about 3 wt %, about 1 wt % to about 5 wt %, about 1.5 wt % to about 2.5 wt %, about 3.5 wt % to about 7 wt %, about 5 wt % to about 10 wt %, or about 1 wt % to about 6 wt %, based on the combined weight of the lignocellulosic substrates and the adhesive mixture. In one or more embodiments, lignocellulosic or wood-based composite products such as particle board, fiberboard, plywood, and oriented strand board, the amount of the adhesive applied to the lignocellulosic substrates can be from a low of about 0.5 wt %, about 1 wt %, about 1.2 wt %, about 1.4 wt %, about 1.6 wt %, about 1.8 wt %, about 2 wt %, about 3 wt %, about 4 wt %, about 5 wt % or about 6 wt % to a high of about 10 wt %, about 12 wt %, about 15 wt %, about 20 wt %, about 25 wt %, or about 30 wt %, based on a dry weight of the lignocellulosic substrates. For example, the amount of the powdered adhesive that can be applied to the lignocellulosic substrates can be about 0.5 wt % to about 3 wt %, about 1 wt % to about 5 wt %, about 1.5 wt % to about 2.5 wt %, about 3.5 wt % to about 7 wt %, about 5 wt % to about 10 wt %, or about 1 wt % to about 6 wt %, based on a dry weight of the lignocellulosic substrates.

The resinated furnish, resinated fiber, and the structure having the adhesive disposed between at least two sheets of wood can be heated to produce the composite product. For example, the temperature the resinated furnish, resinated fiber, and/or the structure having the adhesive disposed between at least two sheets of wood can be heated to produce the composite product can be from a low of about 100° C., about 125° C., about 150° C., or about 170° C. to a high of about 180° C., about 200° C., about 220° C., or about 250° C. The resinated furnish, resinated fiber, and/or the structure having the adhesive disposed between at least two sheets of wood can also be pressed when heated to produce the composite product. For example, the amount of pressure applied to the resinated furnish, resinated fiber, and/or the structure having the mixture disposed between at least two sheets of wood can be from a low of about 1 MPa, about 2 MPa, or about 3 MPa to a high of about 4 MPa, about 5 MPa, about 6 MPa, or about 7 MPa. The length of time the heat and/or pressure can be applied can be from a low of about 15 second, about 30 seconds, about 1 minute, about 3 minutes, about 5 minutes, or about 7 minutes to a high of about 10 minutes, about 15 minutes, about 20 minutes, or about 30 minutes, which can depend, at least in part, on the particular product and/or the particular dimensions, e.g., thickness of the product.

EXAMPLES

In order to provide a better understanding of the foregoing discussion, the following non-limiting examples are offered. Although the examples can be directed to specific embodiments, they are not to be viewed as limiting the invention in any specific respect Example 1

Three inventive adhesives (Examples 1-3) and two comparative adhesives (CEx. 1 and CEx. 2) were prepared. The components used to prepare the adhesives are shown in Table 1 below.

TABLE 1

| Component | Description or source |
| --- | --- |
| Powder Phenol-Formaldehyde Resin | Spray-dried phenol-formaldehyde resin sold by GP Chemicals as WOODWELD ® 190C80. The phenol-formaldehyde resin had a moisture content of about 4.5 wt %, a molar ratio of phenol to formaldehyde of about 2-2.6:1, a pH of about 10.5 to about 12.5 when mixed with water, an average particle size of about 60 μm, and a maximum particle size of about 200 μm. |
| Powder Lignin | Kraft lignin sold by Domtar as DCL200 ®, was oven-dried after receipt to less than 7 wt % of water, had an average particle size of about 6 μm, and a maximum particle size of about 60 μm. |
| Corn flour | Corn flour sold by Bates and Co. as Q-Bond ® Plus that had a moisture content of about 8.5 wt %, an average particle size of about 35 μm, and a maximum particle size of about 200 μm. |
| Wax | Slack wax with an oil content of less than 20 wt % and a melting point range of less than 60° C. and greater than −1.1° C. |

For each adhesive, the components were added into a bucket and manually mixed. The mixture was sieved twice through a 595 μm screen. The mixture that passed the 595 μm screen was sieved through a 250 μm screen. The composition of each adhesive prepared is shown in Table 2 below.

TABLE 2

Adhesive Compositions

| Example | wt % of Powdered PF Resin | wt % of Corn flour | wt % of Powdered Lignin |
| --- | --- | --- | --- |
| 1 | 95 | 0 | 5 |
| 2 | 70 | 0 | 30 |
| 3 | 82.5 | 8.75 | 8.75 |
| CEx. 1 | 95 | 5 | 0 |
| CEx. 2 | 70 | 30 | 0 |

Each adhesive was mixed with an oriented strand board (OSB) furnish to produce a resinated furnish. The OSB furnish was prepared from southern yellow pine according to USDA Forest Products Laboratory guidelines and had a moisture content of about 5 wt % to about 7 wt %. The OSB furnish was placed in a Cissell tumbling dryer and sufficient molten wax was added to the OSB furnish such that the composition was 1 wt % of wax based on the oven dried furnish weight. The furnish was tumbled until the wax was uniformly distributed. The adhesive was added and the OSB furnish and was tumbled until the adhesive was uniformly distributed to produce a resinated OSB furnish. Depending on the particular example, each resinated OSB furnish had an adhesive loading of about 1.6 wt % or about 2 wt % The adhesive loading (wt %) was the amount of adhesive combined with the OSB furnish to produce the resinated OSB furnish, based on the oven dried OSB furnish weight.

The resinated OSB furnish for each example was placed by hand into a forming box and consolidated into a mat of resinated OSB. The mat of resinated OSB was transferred to a heated press and the mat of OSB was pressed with press platens heated to a temperature of about 210° C. for a time period of about 2.75 minutes or about 3.25 minutes to produce an OSB product. All examples were subjected to the same pressure profile that when heated to produce the OSB product, which included pressing up to about 12,000 kPa and reducing the pressure down to about 500 kPa during the press time. The OSB products had a density of about 0.689 g/cm$^3$. After standing for about 16 hours at ambient conditions, the wood panels were trimmed to about 45.7 cm by 45.7 cm and the internal bond strength was measured according to ASTM D1037. Table 3 shows the adhesive loading, press time, and internal bond strength for various OSB products made with the adhesives.

TABLE 3

Internal Bond of OSB Panels Made with the Adhesives

| Adhesive | Resin Loading (wt %) | Press Time (min) | Internal Bond (kPa) |
| --- | --- | --- | --- |
| Ex. 1 | 1.6 | 2.75 | 214 |
| Ex. 2 | 1.6 | 2.75 | 290 |
| Ex. 3 | 1.6 | 2.75 | 248 |
| CEx. 1 | 1.6 | 2.75 | 296 |
| CEx. 2 | 1.6 | 2.75 | 165 |
| Ex. 1 | 2 | 2.75 | 379 |
| Ex. 2 | 2 | 2.75 | 200 |
| Ex. 3 | 2 | 2.75 | 317 |
| CEx. 1 | 2 | 2.75 | 283 |
| CEx. 2 | 2 | 2.75 | 186 |
| Ex. 1 | 1.6 | 3.25 | 262 |
| Ex. 2 | 1.6 | 3.25 | 338 |

TABLE 3-continued

Internal Bond of OSB Panels Made with the Adhesives

| Adhesive | Resin Loading (wt %) | Press Time (min) | Internal Bond (kPa) |
|---|---|---|---|
| Ex. 3 | 1.6 | 3.25 | 331 |
| CEx. 1 | 1.6 | 3.25 | 379 |
| CEx. 2 | 1.6 | 3.25 | 234 |
| Ex. 1 | 2 | 3.25 | 427 |
| Ex. 2 | 2 | 3.25 | 379 |
| Ex. 3 | 2 | 3.25 | 324 |
| CEx. 1 | 2 | 3.25 | 455 |
| CEx. 2 | 2 | 3.25 | 338 |

As shown in Table 3 above, the OSB products of Examples 1-3 had internal bond strengths comparable to or greater than the OSB products of comparative examples CEx. 1 and CEx. 2. Accordingly, the total amount of phenol-formaldehyde resin can be reduced by replacing a portion of the phenol-formaldehyde resin with kraft lignin, while still producing OSB products with similar or even improved internal bond strength.

Example 2

Two oriented strand boards that included a core layer disposed between two face layers were made. The two face layers for each oriented strand board were made with a first adhesive that contained about 80 wt % powder phenol-formaldehyde resin, about 15 wt % powdered kraft lignin that had an ash content of less than 3 wt %, and about 5 wt % of a corn flour. The first adhesive contained less than 10 wt % of water. The phenol-formaldehyde resin in the first adhesive, the kraft lignin, and the corn flour were the same as those used in used in Example 1.

The core layers for both the first and second oriented strand boards were made with a second adhesive, namely, WOODWELD® 401C01, a spray-dried, phenol-formaldehyde resin, sold by GP Chemicals. WOODWELD® 401C01, similar to the phenol-formaldehyde resin used in the face layers, had a moisture content of about 4.5 wt %, a molar ratio of phenol to formaldehyde of about 2-2.6:1, an average particle size of about 60 μm, a maximum particle size of about 200 μm.

The ratio of the face layer to core layer to face layer was 30 to 40 to 30. Both the powder blend and the WOODWELD® 401C01 were applied to the OSB furnish using the procedure described above in Example 1. The loading of second adhesive in the core of both the first and second oriented strand boards was about 2 wt %. The loading of the first adhesive in the first oriented strand board was 1.6 wt % and the loading of the first adhesive in the second oriented strand board was 2 wt %.

The OSB furnish for each example was placed by hand into a forming box and consolidated into a mat of resinated OSB. The mat of resinated OSB was transferred to a heated press and the mat of OSB and pressed between press platens that were heated to a temperature of about 210° C. for a time period of about 4 minutes and 45 seconds to produce OSB products. Both examples were subjected to the same pressure profile as used in Example 1 when heated to produce the OSB product.

The internal bond was measured was measured according to ASTM D1037. The first oriented strand board had an internal bond strength of about 496 kPa. The second oriented strand board had an internal bond strength of about 524 kPa.

Example 3

A prophetic example is carried out for spray drying a mixture of an aqueous phenol-formaldehyde resin and a powdered kraft lignin. Without wishing to be bound by theory, it is believed that a powdered kraft lignin can be mixed with an aqueous phenol-formaldehyde resin to produce a mixture that can be spray dried to produce a spray-dried adhesive containing less than 10 wt % of water. In this prophetic example, kraft lignin is added to an aqueous solution of phenol-formaldehyde resin. The solids content of this mixture is less than 70 wt %, e.g., less than about 60% or less. The pH of the mixture is between 10 and 11. The mixture is spray-dried to produce a spray-dried adhesive with a conical-bottom spray-dryer that includes nozzle atomization. The average particle size of this adhesive is less than 200 microns. The adhesive is then used as a face resin to make an oriented strand board, as described in the previous example.

Embodiments of the present disclosure further relate to any one or more of the following paragraphs:

1. An adhesive composition for wood composites, comprising: a phenol-aldehyde resin; and a lignin material; wherein the adhesive composition is a solid.

2. The adhesive composition according to paragraph 1, wherein the lignin material comprises an aqueous liquid solution.

3. The adhesive composition according to paragraph 1, wherein the lignin material comprises a solid.

4. The adhesive composition according to any one of paragraphs 1 to 3, wherein the lignin material is present in the adhesive composition in an amount in the range of about 10 wt % to about 40 wt % of the adhesive composition.

5. The adhesive composition according to any one of paragraphs 1 to 4, wherein the weight ratio of the lignin material to the phenol-aldehyde resin is in the range of about 5:95 to about 40:60.

6. The adhesive composition according to any one of paragraphs 1 to 5, wherein a ratio of the aldehyde to the phenol is in the range of about 1:10 to about 10:1.

7. The adhesive composition according to any one of paragraphs 1 to 6, wherein the aldehyde comprises formaldehyde.

8. The adhesive composition according to any one of paragraphs 1 to 7, wherein the phenol comprises one or more polyphenols.

9. The adhesive composition according to any one of paragraphs 1 to 8, wherein the solid has a moisture content of less than about 15% by weight.

10. The adhesive composition according to any one of paragraphs 1 to 9, wherein the lignin material is Kraft lignin.

11. The adhesive composition according to any one of paragraphs 1 to 10, further comprising at least one filler.

12. The adhesive composition according to any one of paragraphs 1 to 11, further comprising at least one extender.

13. An adhesive mixture, the mixture comprising: a pre-formed phenol-aldehyde resin, the resin comprising at least one aldehyde and at least one phenol; and at least one lignin material.

14. The adhesive mixture according to paragraph 13, wherein the at least one lignin material comprises a solid.

15. The adhesive mixture according to paragraph 13 or 14, wherein the at least one lignin material is present in the adhesive mixture in an amount in the range of about 10 wt % to about 40 wt % of the adhesive mixture.

16. The adhesive mixture according to any one of paragraphs 13 to 15, wherein the weight ratio of the at least one lignin material to the pre-formed phenol-aldehyde resin is in the range of about 5:95 to about 40:60.

17. The adhesive mixture according to any one of paragraphs 13 to 16, wherein a ratio of the at least one aldehyde to the at least one phenol is in the range of about 1.5:1 to about 3:1.

18. The adhesive mixture according to any one of paragraphs 13 to 17, wherein the adhesive mixture is a solid.

19. The adhesive mixture according to any one of paragraphs 13 to 18, wherein the at least one aldehyde comprises formaldehyde.

20. The adhesive mixture according to any one of paragraphs 13 to 19, wherein the at least one phenol comprises a polyphenol.

21. The adhesive mixture according to any one of paragraphs 13 to 20, wherein the at least one lignin is Kraft lignin.

22. The adhesive mixture according to any one of paragraphs 13 to 21, further comprising at least one filler.

23. The adhesive mixture according to any one of paragraphs 13 to 22, further comprising at least one extender.

24. The adhesive mixture according to any one of paragraphs 13 to 23, wherein the pre-formed phenol-aldehyde resin is a solid.

25. The adhesive mixture according to any one of paragraphs 13 to 24, wherein the pre-formed phenol-aldehyde resin is a liquid.

26. A composition suitable for bonding wood, the composition comprising: a phenol-formaldehyde resin; and a lignin material; wherein the composition bonds wood in a substantially similar way to a traditional phenol-formaldehyde resin.

27. The composition according to paragraph 26, wherein the lignin material comprises an aqueous liquid solution.

28. The composition according to paragraph 26, wherein the lignin material comprises a solid.

29. The composition according to any one of paragraphs 26 to 28, wherein the lignin material is present in the composition in an amount in the range of about 10 wt % to about 40 wt % of the composition.

30. The composition according to any one of paragraphs 26 to 29, wherein the weight ratio of the lignin material to the phenol-formaldehyde resin is in the range of about 5:95 to about 40:60.

31. The composition according to any one of paragraphs 26 to 30, wherein a ratio of the formaldehyde to the phenol is in the range of about 1.5:1 to about 3:1.

32. The composition according to any one of paragraphs 26 to 31, wherein the composition is a solid and has a moisture content of less than about 15% by weight.

33. The composition according to any one of paragraphs 26 to 32, wherein the lignin material is Kraft lignin.

34. The composition according to any one of paragraphs 26 to 33, further comprising at least one filler.

35. The composition according to any one of paragraphs 26 to 24, further comprising at least one extender.

36. An adhesive composition for bonding wood comprising a phenol-formaldehyde resin, wherein at least a portion of the phenol-formaldehyde resin of the adhesive composition has been replaced by one or more lignin materials.

37. The adhesive composition according to paragraph 36, wherein about 50% of the phenol-formaldehyde resin has been replaced by the one or more lignin materials.

38. A wood-based composite structure comprising: one or more wood-based composite panels; and an adhesive comprising a mixture of a phenol-formaldehyde resin and a lignin material.

39. The composite structure according to paragraph 38, wherein the lignin material comprises an aqueous liquid solution.

40. The composite structure according to paragraph 38, wherein the lignin material comprises a solid.

41. The composite structure according to any one of paragraphs 38 to 40, wherein the lignin material is present in the adhesive in an amount in the range of about 10 wt % to about 40 wt % of the adhesive.

42. The composite structure according to any one of paragraphs 38 to 41, wherein the weight ratio of the lignin material to the phenol-formaldehyde resin is in the range of about 5:95 to about 40:60.

43. The composite structure according to any one of paragraphs 38 to 42, wherein a ratio of formaldehyde to phenol in the phenol-formaldehyde resin is in the range of about 1.5:1 to about 3:1.

44. The composite structure according to any one of paragraphs 38 to 43, wherein the adhesive has a moisture content of less than about 15% by weight.

45. The composite structure according to any one of paragraphs 38 to 44, wherein the lignin material is Kraft lignin.

46. The composite structure according to any one of paragraphs 38 to 45, wherein the adhesive further comprises at least one filler.

47. The composite structure according to any one of paragraphs 38 to 46, wherein the adhesive further comprises at least one extender.

48. An adhesive mixture comprising: an aldehyde; a phenol; and a lignin material.

49. The adhesive mixture according to paragraph 48, wherein there is substantially no reaction between the aldehyde and the lignin material within the adhesive mixture.

50. The adhesive mixture according to paragraph 48 or 49, wherein there is substantially no reaction between the phenol and the lignin material within the adhesive mixture.

51. The adhesive mixture according to any one of paragraphs 48 to 50, wherein the aldehyde and the phenol react to form a phenol-aldehyde resin.

52. The adhesive mixture according to paragraph 51, wherein there is substantially no reaction between the phenol-aldehyde resin and the lignin material within the adhesive mixture.

53. A method for preparing a wood-based composite structure comprising: providing a first wood-based composite panel; and adding an adhesive to the first wood-based composite panel, the adhesive comprising a mixture of a phenol-formaldehyde resin and a lignin material.

54. The method according to paragraph 53, wherein the lignin material is present in the mixture in an amount in the range of about 10 wt % to about 40 wt % of the mixture.

55. The method according to paragraph 53 or 54, wherein the weight ratio of the lignin material to the phenol-formaldehyde resin in the mixture is in the range of about 5:95 to about 40:60.

56. The method according to any one of paragraphs 53 to 55, wherein a ratio of formaldehyde to phenol in the phenol-formaldehyde resin is in the range of about 1.5:1 to about 3:1.

57. The method according to any one of paragraphs 53 to 56, wherein the adhesive has a moisture content of less than about 15% by weight.

58. The method according to any one of paragraphs 53 to 57, wherein the lignin material is Kraft lignin.

59. The method according to any one of paragraphs 53 to 58, wherein the adhesive further comprises at least one filler.

60. The method according to any one of paragraphs 53 to 59, wherein the adhesive further comprises at least one extender.

61. A method for preparing an adhesive comprising: providing a liquid phenol-formaldehyde resin; combining a solid lignin material and the liquid phenol-formaldehyde resin to form a mixture; and mixing the mixture to form the adhesive.

62. The method according to paragraph 61, wherein the adhesive is a solid.

63. The method according to paragraph 61 or 62, wherein no heat is applied during the step of mixing.

64. The method according to any one of paragraphs 61 to 63, wherein mixing is done at about ambient temperature.

65. The method according to any one of paragraphs 61 to 64, wherein the lignin material is present in the mixture in an amount in the range of about 10 wt % to about 40 wt % of the mixture.

66. The method according to any one of paragraphs 61 to 65, wherein the weight ratio of the lignin material to the liquid phenol-formaldehyde resin in the mixture is in the range of about 5:95 to about 40:60.

67. The method according to any one of paragraphs 61 to 66, wherein a ratio of formaldehyde to phenol in the liquid phenol-formaldehyde resin is in the range of about 1.5:1 to about 3:1.

68. The method according to any one of paragraphs 61 to 67, wherein the adhesive has a moisture content of less than about 15% by weight.

69. The method according to any one of paragraphs 61 to 68, wherein the lignin material is Kraft lignin.

70. The method according to any one of paragraphs 61 to 69, further comprising the step of adding at least one filler to the mixture.

71. The method according to any one of paragraphs 61 to 70, further comprising the step of adding at least one extender to the mixture.

72. A method for preparing an adhesive comprising: providing a solid phenol-formaldehyde resin; combining a solid lignin material and the solid phenol-formaldehyde resin to form a mixture; and mixing the mixture to form the adhesive.

73. The adhesive according to paragraph 72, wherein the adhesive is a solid.

74. The method according to paragraph 72 or 73, wherein the lignin material is present in the mixture in an amount in the range of about 10 wt % to about 40 wt % of the mixture.

75. The method according to any one of paragraphs 72 to 74, wherein the weight ratio of the lignin material to the solid phenol-formaldehyde resin in the mixture is in the range of about 5:95 to about 40:60.

76. The method according to any one of paragraphs 72 to 75, wherein a ratio of formaldehyde to phenol in the solid phenol-formaldehyde resin is in the range of about 1.5:1 to about 3:1.

77. The method according to any one of paragraphs 72 to 76, wherein the adhesive has a moisture content of less than about 15% by weight.

78. The method according to any one of paragraphs 72 to 77, wherein the lignin material is kraft lignin.

79. The method according to any one of paragraphs 72 to 78, further comprising the step of adding at least one filler to the mixture.

80. The method according to any one of paragraphs 72 to 79, further comprising the step of adding at least one extender to the mixture.

81. A method for preparing an adhesive binder for wood composites, comprising: obtaining a lignin material; providing a phenol-formaldehyde resin; and mixing the lignin material and the phenol-formaldehyde resin to form the adhesive binder.

82. The method according to paragraph 81, wherein the lignin material is present in the adhesive binder in an amount in the range of about 10 wt % to about 40 wt % of the adhesive binder.

83. The method according to paragraph 81 or 82, wherein the weight ratio of the lignin material to the phenol-formaldehyde resin in the adhesive binder is in the range of about 5:95 to about 40:60.

84. The method according to any one of paragraphs 81 to 83, wherein a ratio of formaldehyde to phenol in the phenol-formaldehyde resin is in the range of about 1.5:1 to about 3:1.

85. The method according to any one of paragraphs 81 to 84, wherein the adhesive binder has a moisture content of less than about 15% by weight.

86. The method according to any one of paragraphs 81 to 85, wherein the lignin material is kraft lignin.

87. The method according to any one of paragraphs 81 to 86, further comprising the step of applying the adhesive binder to a wood composite.

88. An adhesive composition as described herein, wherein the adhesive composition comprises a lignin material and a phenol-aldehyde resin mixture, and there is substantially no reaction between the lignin material and phenol-aldehyde resin.

89. A method of preparing an adhesive composition as described herein.

90. A wood composite structure comprising an adhesive composition as described herein.

91. A powdered adhesive for making lignocellulose composite products, comprising: a powdered phenol-aldehyde resin; a powdered kraft lignin comprising less than 3 wt % of ash, as measured according to ASTM D2584-11; and less than 10 wt % of water.

92. A method for making a powdered adhesive, comprising: mixing a powdered phenol-aldehyde resin and a powdered kraft lignin to produce a powdered adhesive, wherein the powdered kraft lignin comprises less than 3 wt % of ash, as measured according to ASTM D2584-11, and wherein the powdered adhesive comprises less than 10 wt % of water.

93. A method for making a powdered adhesive, comprising: mixing a liquid phenol-aldehyde resin and a powdered kraft lignin to produce a mixture; drying the mixture to produce a powdered adhesive, wherein the kraft lignin comprises less than 3 wt % of ash, as measured according to ASTM D2584-11, and wherein the powdered adhesive comprises less than 10 wt % of water.

94. A method for making a composite product, comprising: contacting a plurality of lignocellulose substrates with a powdered adhesive to produce a resinated furnish, the powdered adhesive comprising: a powdered phenol-aldehyde resin; a powdered kraft lignin comprising less than 3 wt % of ash, as measured according to ASTM D2584-11; and less than 10 wt % of water; and at least partially curing the powdered adhesive to produce a composite product.

95 A composite product, comprising: a plurality of lignocellulose substrates and an at least partially cured powdered adhesive, wherein the powdered adhesive, prior to curing, comprises: a powdered phenol-aldehyde resin; a powdered kraft lignin comprising less than 3 wt % of ash, as measured according to ASTM D2584-11; and less than 10 wt % of water.

96. A powdered adhesive for making lignocellulose composite products, comprising: a powdered phenol-aldehyde resin; a powdered lignin material; and less than 10 wt % of water.

97. A method for making a powdered adhesive, comprising: mixing a powdered phenol-aldehyde resin and a powdered lignin material to produce a powdered adhesive, wherein the powdered adhesive comprises less than 10 wt % of water.

98. A method for making a powdered adhesive, comprising: mixing a liquid phenol-aldehyde resin and a powdered lignin material to produce a mixture; drying the mixture to produce a powdered adhesive, wherein the powdered adhesive comprises less than 10 wt % of water.

99. A method for making a composite product, comprising: contacting a plurality of lignocellulose substrates with a powdered adhesive to produce a resinated furnish, the powdered adhesive comprising: a powdered phenol-aldehyde resin; a powdered lignin material; and less than 10 wt % of water; and at least partially curing the powdered adhesive to produce a composite product.

100. A composite product, comprising: a plurality of lignocellulose substrates and an at least partially cured powdered adhesive, wherein the powdered adhesive, prior to curing, comprises: a powdered phenol-aldehyde resin; a powdered lignin material; and less than 10 wt % of water.

101. The powdered adhesive, method, or composite product according to any one of paragraphs 91 to 95, wherein the powdered adhesive comprises about 5 wt % to about 50 wt % of the powdered kraft lignin, based on the combined weight of the powdered phenol-aldehyde resin and the powdered kraft lignin.

102. The powdered adhesive, method, or composite product according to any one of paragraphs 91 to 101, wherein the powdered phenol-aldehyde resin comprises a phenol-formaldehyde resin, and wherein the phenol-formaldehyde resin has a molar ratio of formaldehyde to phenol of about 1.5:1 to about 3:1.

103. The powdered adhesive, method, or composite product according to any one of paragraphs 91 to 95, wherein the powdered phenol-aldehyde resin has an average particle size of about 20 μm to about 200 μm, and wherein the powdered kraft lignin has an average particle size of about 1 μm to about 80 μm.

104. The powdered adhesive, method, or composite product according to any one of paragraphs 91 to 95, wherein the powdered phenol-aldehyde resin comprises less than 10 wt % of water, and wherein the powdered kraft lignin comprises less than 10 wt % of water.

105. The powdered adhesive, method, or composite product according to any one of paragraphs 91 to 95, wherein: the powdered phenol-aldehyde resin comprises a phenol-formaldehyde resin, the powdered phenol-aldehyde resin has an average particle size of about 40 μm to about 80 μm, and the powdered kraft lignin has an average particle size of about 2 μm to about 40 μm.

106. The powdered adhesive, method, or composite product according to any one of paragraphs 91 to 95, wherein the powdered adhesive comprises about 5 wt % to about 50 wt % of the kraft lignin and about 50 wt % to about 95 wt % of the phenol-aldehyde resin, and wherein an aqueous dispersion comprising about 25 wt % of the adhesive has a pH of about 7 to about 14.

107. The powdered adhesive, method, or composite product according to any one of paragraphs 91 to 106, wherein the powdered adhesive further comprises (1) a filler, (2) an extender, or (3) a filler and an extender.

108. The powdered adhesive, method, or composite product according to paragraph 107, wherein the powdered adhesive comprises the extender, and wherein the extender comprises corn flour, soy flour, wheat flour, spray dried blood, or any mixture thereof.

109. The powdered adhesive, method, or composite product according to paragraph 107 or 108, wherein the powdered adhesive comprises the filler, and wherein the filler comprises a nut shell, a seed shell, a fruit pit, an animal bone, a milwhite, a clay, a glass, an inorganic oxide, or any mixture thereof.

110. The powdered adhesive, method, or composite product according to any one of paragraphs 91 to 95, wherein: the powdered adhesive further comprises (1) a filler; (2) and extender, or (3) a filler and an extender, the powdered phenol-aldehyde resin comprises less than 10 wt % of water, the powdered kraft lignin comprises less than 10 wt % of water, the powdered phenol-aldehyde resin has an average particle size of about 20 μm to about 200 μm, the powdered kraft lignin has an average particle size of about 1 μm to about 80 μm, the powdered adhesive comprises about 5 wt % to about 50 wt % of the powdered kraft lignin, based on the combined weight of the powdered phenol-aldehyde resin and the powdered kraft lignin, the filler comprises a nut shell, a seed shell, or a mixture thereof, the extender comprises corn flour, soy flour, wheat flour, or a mixture thereof, the powdered adhesive comprises about 5 wt % to about 50 wt % of the kraft lignin and about 50 wt % to about 95 wt % of the phenol-aldehyde resin, an aqueous dispersion comprising about 25 wt % of the adhesive has a pH of about 7 to about 14, the powdered phenol-aldehyde resin comprises a phenol-formaldehyde resin, and the phenol-formaldehyde resin has a molar ratio of formaldehyde to phenol of about 1.5:1 to about 3:1.

111. The powdered adhesive, method, or composite product according to any one of paragraphs 91 to 110, wherein the mixture comprises less than 7 wt % of water.

112. The powdered adhesive, method, or composite product according to any one of paragraphs 91 to 111, wherein the mixture comprises less than 5 wt % of water.

113. The powdered adhesive, method, or composite product according to any one of paragraphs 91 to 112, wherein the mixture comprises less than 4 wt % of water.

114. The powdered adhesive, method, or composite product according to any one of paragraphs 91 to 113, wherein the mixture comprises less than 3 wt % of water.

115. The powdered adhesive, method, or composite product according to any one of paragraphs 91 to 114, wherein the mixture comprises less than 2 wt % of water.

116. The powdered adhesive, method, or composite product according to any one of paragraphs 91 to 115, wherein the mixture comprises less than 1 wt % of water.

117. The powdered adhesive, method, or composite product according to any one of paragraphs 91 to 116, wherein the mixture comprises less than 0.5 wt % of water 118. The method or composite product according to any one of paragraphs 94, 99, or 101 to 117, wherein at least partially curing the powdered adhesive comprises heating the resinated furnish to a temperature of about 150° C. to about 275° C. for a time of about 30 seconds to about 10 minutes.

119. The powdered adhesive, method, or composite product according to any one of paragraphs 91 to 118, wherein the powdered adhesive has an explosion constant ($K_{st}$) of less than 300 bar m/s.

120. The powdered adhesive, method, or composite product according to any one of paragraphs 91 to 119, wherein the powdered adhesive has an explosion constant ($K_{st}$) of less than 200 bar m/s.

121. The powdered adhesive, method, or composite product according to any one of paragraphs 91 to 120, wherein the mixture has a minimum ignition energy (MIE) of at least 100 mJ.

122. The powdered adhesive, method, or composite product according to any one of paragraphs 91 to 121, wherein the powdered adhesive has a minimum ignition energy (MIE) of at least 500 mJ.

123. The powdered adhesive, method, or composite product according to any one of paragraphs 91 to 95 and 101 to 122, wherein the powdered kraft lignin has a maximum particle size of 200 μm, and wherein the phenol-aldehyde resin has a maximum particle size of 500 μm.

124. The powdered adhesive, method, or composite product according to any one of paragraphs 91 to 95 and 101 to 123, wherein the powdered adhesive has an explosion constant ($K_{st}$) of about 5 bar m/s to about 295 bar m/s and a minimum ignition energy (MIE) of about 1,000 mJ to about 10,000 mJ.

125. The powdered adhesive, method, or composite product according to any one of paragraphs 91 to 124, wherein the powdered adhesive has an explosion constant ($K_{st}$) of about 100 bar m/s to about 200 bar m/s and a minimum ignition energy (MIE) of about 1,000 mJ to about 10,000 mJ.

126. The powdered adhesive, method, or composite product according to any one of paragraphs 91 to 95 or 101 to 125, wherein the powdered kraft lignin comprises less than 3 wt %, less than 2.7 wt %, less than 2.5 wt %, less than 2.3 wt %, less than 2 wt %, less than 1.7 wt %, less than 1.5 wt %, less than 1.3 wt %, less than 1 wt %, less than 0.9 wt %, less than 0.8 wt %, less than 0.7 wt % less than 0.6 wt %, less than 0.5 wt %, less than 0.4 wt %, less than 0.3 wt %, less than 0.2 wt %, less than 0.1 wt %, less than 0.07 wt %, less than 0.05 wt %, or less than 0.02 wt % of ash, based on a dry weight of the powdered kraft lignin.

127. The powdered adhesive, method, or composite product according to any one of paragraphs 91 to 95 or 101 to 126, wherein the powdered kraft lignin comprises less than 5 wt % of sulfur, less than 4.5 wt % of sulfur, less than 4 wt % of sulfur, less than 3.5 wt % of sulfur, less than 3 wt % of sulfur, less than 2.7 wt % of sulfur, less than 2.5 wt % of sulfur, less than 2.3 wt % of sulfur, less than 2 wt % of sulfur, less than 1.7 wt % of sulfur, or less than 1.5 wt % of sulfur.

128. The powdered adhesive, method, or composite product according to any one of paragraphs 91 to 95 or 101 to 127, wherein the powdered kraft lignin has a ratio of aromatic carbon atoms plus alkenic carbon atoms to aliphatic carbon atoms of about 1:1, about 1.3:1, about 1.5:1, about 1.7:1, about 2:1, about 2.3:1, about 2.5:1, or about 2.7:1 to about 3.5:1, about 3.7:1, about 4:1, about 4.3:1, about 4.5:1, about 4.7:1, about 5:1, about 5.3:1, about 5.5:1, about 5.7:1, or about 6:1, based on quantitative analysis of $^{13}C$ NMR spectra of the powdered kraft lignin.

129. The powdered adhesive, method, or composite product according to any one of paragraphs 91 to 95 or 101 to 128, wherein the powdered kraft lignin has a ratio of aromatic carbon atoms plus alkenic carbon atoms to aliphatic carbon atoms of at least 2.5:1, at least 2.7:1, at least 3:1, at least 3.3:1, at least 3.5:1, at least 3.7:1, at least 4:1, at least 4.3:1, at least 4.5:1, at least 4.7:1, or at least 5:1 to about 5.3:1, about 5.5:1, about 5.7:1, or about 6:1, based on quantitative analysis of $^{13}C$ NMR spectra of the powdered kraft lignin.

130. The powdered adhesive, method, or composite product according to any one of paragraphs 91 to 95 or 101 to 129, wherein the powdered kraft lignin and the phenol-aldehyde resin in the mixture are separate components that have not reacted to form a reaction product.

131. The powdered adhesive, method, or composite product according to any one of paragraphs 91 to 95 or 101 to 130, wherein the powdered kraft lignin and the phenol-aldehyde resin in the mixture are discrete components that have not reacted to form a reaction product.

132. The powdered adhesive, method, or composite product according to any one of paragraphs 91 to 95 or 101 to 131, wherein the powdered kraft lignin and the phenol-aldehyde resin cannot be represented by a single chemical formula.

133. The powdered adhesive, method, or composite product according to any one of paragraphs 91 to 95 or 101 to 132, wherein the powdered kraft lignin and the phenol-aldehyde resin are heterogeneously associated with one another.

134. The powdered adhesive, method, or composite product according to any one of paragraphs 91 to 95 or 101 to 133, wherein the powdered kraft lignin and the phenol-aldehyde resin are uniformly dispersed together.

135. The powdered adhesive, method, or composite product according to any one of paragraphs 91 to 95 or 101 to 133, wherein the powdered kraft lignin and the phenol-aldehyde resin are not uniformly dispersed together.

136. The powdered adhesive, method, or composite product according to any one of paragraphs 91 to 95 or 101 to 135, wherein the powdered kraft lignin and the phenol-aldehyde resin can be mechanically separated from one another.

137. The powdered adhesive, method, or composite product according to any one of paragraphs 96 to 100, wherein the powdered adhesive further comprises (1) a filler; (2) and extender, or (3) a filler and an extender.

138. The powdered adhesive, method, or composite product according to any one of paragraphs 96 to 100 and 137, wherein the powdered phenol-aldehyde resin comprises less than 10 wt % of water.

139. The powdered adhesive, method, or composite product according to any one of paragraphs 96 to 100, 137, and 138, wherein the powdered lignin material comprises less than 10 wt % of water.

140. The powdered adhesive, method, or composite product according to any one of paragraphs 96 to 100 and 137 to 139, wherein the powdered phenol-aldehyde resin has an average particle size of about 20 μm to about 200 μm.

141. The powdered adhesive, method, or composite product according to any one of paragraphs 96 to 100 and 137 to 140, wherein the powdered lignin material has an average particle size of about 1 μm to about 80 μm, 142. The powdered adhesive, method, or composite product according to any one of paragraphs 96 to 100 and 137 to 141, wherein the powdered adhesive comprises about 5 wt % to about 50 wt % of the powdered lignin material, based on the combined weight of the powdered phenol-aldehyde resin and the powdered lignin material.

143. The powdered adhesive, method, or composite product according to any one of paragraphs 96 to 100 and 137 to 142, wherein the powdered adhesive comprises the filler, and wherein the filler comprises a nut shell, a seed shell, or a mixture thereof.

144. The powdered adhesive, method, or composite product according to any one of paragraphs 96 to 100 and 137 to 143, wherein the powdered adhesive comprises the extender, and wherein the extender comprises corn flour, soy flour, wheat flour, or a mixture thereof.

145. The powdered adhesive, method, or composite product according to any one of paragraphs 96 to 100 and 137 to 144, wherein the powdered adhesive comprises about 5 wt % to about 50 wt % of the powdered lignin material and about 50 wt % to about 95 wt % of the powdered phenol-aldehyde resin, and wherein an aqueous dispersion comprising about 25 wt % of the adhesive has a pH of about 7 to about 14.

146. The powdered adhesive, method, or composite product according to any one of paragraphs 96 to 100 and 137 to 145, wherein the powdered phenol-aldehyde resin comprises a phenol-formaldehyde resin.

147. The powdered adhesive, method, or composite product according to any one of paragraphs 96 to 100 and 137 to 146, wherein the phenol-formaldehyde resin has a molar ratio of formaldehyde to phenol of about 1.5:1 to about 3:1.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A powdered adhesive for making lignocellulose composite products, comprising:
    a powdered phenol-aldehyde resin;
    a powdered kraft lignin comprising less than 3 wt % of ash, as measured according to ASTM D2584-11; and
    less than 10 wt % of water, wherein the powdered adhesive comprises about 5 wt % to about 50 wt % of the powdered kraft lignin, based on a combined weight of the powdered phenol-aldehyde resin and the powdered kraft lignin, and wherein there is substantially no reaction between the powdered phenol-aldehyde resin and the powdered kraft lignin.

2. The powdered adhesive of claim 1, wherein the powdered kraft lignin comprises less than 1 wt % of ash, as measured according to ASTM D2584-11.

3. The powdered adhesive of claim 1, wherein the powdered adhesive comprises about 5 wt % to about 20 wt % of the powdered kraft lignin, based on the combined weight of the powdered phenol-aldehyde resin and the powdered kraft lignin.

4. The powdered adhesive of claim 1, wherein the powdered phenol-aldehyde resin comprises a phenol-formaldehyde resin, and wherein the phenol-formaldehyde resin has a molar ratio of formaldehyde to phenol of about 1.5:1 to about 3:1.

5. The powdered adhesive of claim 1, wherein the powdered phenol-aldehyde resin has an average particle size of about 20 um to about 200 um, and wherein the powdered kraft lignin has an average particle size of about 1 um to about 80 um.

6. The powdered adhesive of claim 1, wherein:
    the powdered phenol-aldehyde resin comprises a phenol-formaldehyde resin,
    the powdered phenol-aldehyde resin has an average particle size of about 40 μm to about 80 μm, and
    the powdered kraft lignin has an average particle size of about 2 μm to about 40 μm.

7. The powdered adhesive of claim 1, wherein the powdered adhesive comprises about 5 wt % to about 25 wt % of the powdered kraft lignin, based on the combined weight of the powdered phenol-aldehyde resin and the powdered kraft lignin, and wherein an aqueous dispersion comprising about 25 wt % of the powdered adhesive has a pH of about 7 to about 14.

8. The powdered adhesive of claim 1, further comprising (1) a filler, (2) an extender, or (3) a filler and an extender.

9. The powdered adhesive of claim 8, wherein the powdered adhesive comprises the extender, and wherein the extender comprises corn flour, soy flour, wheat flour, spray dried blood, or any mixture thereof.

10. The powdered adhesive of claim 8, wherein the powdered adhesive comprises the filler, and wherein the filler comprises a nut shell, a seed shell, a fruit pit, an animal bone, a clay, a glass, an inorganic oxide, or any mixture thereof.

11. A method for making a composite product, comprising:
    contacting a plurality of lignocellulose substrates with a powdered adhesive to produce a resinated furnish, the powdered adhesive comprising:
        a powdered phenol-aldehyde resin;
        a powdered kraft lignin comprising less than 3 wt % of ash, as measured according to ASTM D2584-11; and
        less than 10 wt % of water, wherein the powdered adhesive comprises about 5 wt % to about 50 wt % of the powdered kraft lignin, based on a combined weight of the powdered phenol-aldehyde resin and the powdered kraft lignin; and
    at least partially curing the powdered adhesive to produce a composite product, wherein there is substantially no reaction between the powdered phenol-aldehyde resin and the powdered kraft lignin when the powdered adhesive is at least partially cured.

12. The method of claim 11, wherein the powdered kraft lignin comprises less than 1 wt % of ash, as measured according to ASTM D2584-11.

13. The method of claim 11, wherein at least partially curing the powdered adhesive comprises heating the resinated furnish to a temperature of about 150° C. to about 275° C. for a time of about 30 seconds to about 10 minutes.

14. The method of claim 11, wherein:
    the powdered phenol-aldehyde resin has an average particle size of about 20 μm to about 200 μm,
    the powdered kraft lignin has an average particle size of about 1 μm to about 80 μm, and
    the powdered adhesive comprises about 5 wt % to about 40 wt % of the powdered kraft lignin, based on the combined weight of the powdered phenol-aldehyde resin and the powdered kraft lignin.

15. The method of claim 11, wherein the powdered adhesive further comprises (1) a filler, (2) an extender, or (3) a filler and an extender.

16. A composite product, comprising:
a plurality of lignocellulose substrates and an at least partially cured powdered adhesive, wherein the powdered adhesive, prior to curing, comprises:
a powdered phenol-aldehyde resin; and
a powdered kraft lignin comprising less than 3 wt % of ash, as measured according to ASTM D2584-11, and less than 10 wt % of water, wherein the powdered adhesive comprises about 5 wt % to about 50 wt % of the powdered kraft lignin, based on a combined weight of the powdered phenol-aldehyde resin and the powdered kraft lignin, and wherein there is substantially no reaction between the powdered phenol-aldehyde resin and the powdered kraft lignin when the powdered adhesive is at least partially cured.

17. The composite product of claim 16, wherein the powdered adhesive, prior to curing, further comprises (1) a filler, (2) an extender, or (3) a filler and an extender.

18. The composite product of claim 16, wherein:
the powdered phenol-aldehyde resin has an average particle size of about 20 um to about 200 um,
the powdered phenol-aldehyde resin comprises a phenol-formaldehyde resin,
the phenol-formaldehyde resin has a molar ratio of formaldehyde to phenol of about 1.5:1 to about 3:1,
the powdered kraft lignin has an average particle size of about 1 um to about 80 um, and
the powdered adhesive comprises about 5 wt % to about 40 wt % of the powdered kraft lignin, based on the combined weight of the powdered phenol-aldehyde resin and the powdered kraft lignin.

* * * * *